(12) United States Patent
Finch et al.

(10) Patent No.: US 11,010,889 B2
(45) Date of Patent: *May 18, 2021

(54) MEASUREMENT PLATFORM THAT AUTOMATICALLY DETERMINES WEAR OF MACHINE COMPONENTS BASED ON IMAGES

(71) Applicant: Caterpillar Inc., Deerfield, IL (US)

(72) Inventors: Nolan Finch, Chicago, IL (US); Lingyu Ma, Santa Clara, CA (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/353,560

(22) Filed: Mar. 14, 2019

(65) Prior Publication Data

US 2019/0392569 A1     Dec. 26, 2019

Related U.S. Application Data

(63) Continuation of application No. 16/015,340, filed on Jun. 22, 2018, now Pat. No. 10,282,834.

(51) Int. Cl.
*G06T 7/00* (2017.01)
*G06T 7/13* (2017.01)
(Continued)

(52) U.S. Cl.
CPC ............... *G06T 7/001* (2013.01); *G06T 7/13* (2017.01); *G06T 7/254* (2017.01); *G06T 7/50* (2017.01);
(Continued)

(58) Field of Classification Search
CPC ................... G01N 21/8851; G06F 17/5086
See application file for complete search history.

(56) References Cited

U.S. PATENT DOCUMENTS 8,756,085 B1   6/2014   Plummer et al.
9,609,288 B1   3/2017   Richman et al.
(Continued)

OTHER PUBLICATIONS

Xu Zhihua et al.: Extraction of damaged building's geometric features from multi-source point clouds, 2014 IEEE Geoscience and Remote Sensing Symposium, IEEE, Jul. 13, 2014 (Jul. 13, 2014), pp. 4764-4767, XP032674132, DOI: 10.1109/1GARSS.2014.6947559 (retrieved on Nov. 5, 2014) 2.4. Point Cloud Registration: p. 4766.

(Continued)

*Primary Examiner* — Phi Hoang
(74) *Attorney, Agent, or Firm* — Bookoff McAndrews

(57) ABSTRACT

A device for measuring wear is disclosed. The device may receive images associated with a component, and may receive a three-dimensional (3D) model of the component. The device may generate an image point cloud based on the images, and may generate a model point cloud based on the 3D model of the component. The device may perform a first alignment of the image point cloud and the model point cloud to generate first-aligned point clouds, and may perform a second alignment of the first-aligned point clouds to generate second-aligned point clouds. The device may generate 3D mask regions based on the second-aligned point clouds, and may project the 3D mask regions on the images. The device may process the 3D mask regions, projected on the images, to determine reference points in the images, and may determine an amount of wear associated with the component based on the reference points.

18 Claims, 14 Drawing Sheets

(51) Int. Cl.
*G06T 7/50* (2017.01)
*G06T 19/20* (2011.01)
*G06T 7/254* (2017.01)

(52) U.S. Cl.
CPC .... *G06T 19/20* (2013.01); *G06T 2207/10028* (2013.01); *G06T 2207/20024* (2013.01); *G06T 2207/20061* (2013.01); *G06T 2207/20212* (2013.01); *G06T 2207/30164* (2013.01); *G06T 2210/56* (2013.01); *G06T 2219/2004* (2013.01); *G06T 2219/2016* (2013.01)

(56) References Cited

U.S. PATENT DOCUMENTS

| | | |
|---|---|---|
| 9,613,413 B2 | 4/2017 | Hasselbusch et al. |
| 9,875,535 B2 | 1/2018 | Finch et al. |
| 9,880,075 B2 | 1/2018 | Finch et al. |
| 9,886,771 B1 | 2/2018 | Chen et al. |
| 9,984,499 B1* | 5/2018 | Jurgenson ............. G06T 19/006 |
| 2012/0153714 A1* | 6/2012 | Yelistratov ........... B62D 55/145 |
| | | 305/137 |
| 2013/0231892 A1 | 9/2013 | Franke et al. |
| 2015/0009214 A1 | 1/2015 | Lee et al. |
| 2015/0206345 A1 | 7/2015 | Chang et al. |
| 2015/0283654 A1 | 10/2015 | Ernst et al. |
| 2016/0017823 A1* | 1/2016 | Sloan ................... F02M 69/462 |
| | | 123/457 |
| 2017/0091375 A1 | 3/2017 | Lu et al. |
| 2017/0287757 A1* | 10/2017 | Kwasnick ......... H01L 21/67288 |
| 2018/0002039 A1 | 1/2018 | Finn et al. |
| 2018/0018787 A1 | 1/2018 | Giancola et al. |
| 2018/0144500 A1 | 5/2018 | Lam et al. |
| 2018/0174325 A1 | 6/2018 | Fu et al. |
| 2018/0232964 A1* | 8/2018 | Chen .................... G07C 5/0808 |
| 2018/0322366 A1* | 11/2018 | Lim ..................... G06K 9/6255 |
| 2018/0341836 A1 | 11/2018 | Lim et al. |
| 2019/0189007 A1* | 6/2019 | Herman ........... G08G 1/096758 |
| 2019/0279420 A1* | 9/2019 | Moreno ................. G06F 30/13 |

OTHER PUBLICATIONS

Igor Jovancevic: "Exterior inspection of an aircraft using a Pan-Tilt-Zoom camera and a 3D scanner moved by a mobile robot: 2D image processing and 3D point cloud analysis", Nov. 21, 2016 (Nov. 21, 2016), pp. 1-215, XP055621853. Toulouse, France Retrieved from the internet: URL:https://tel.archives-ouvertes.fr/tel-01687831/file/JovancevicIgorDiff.pdf (Retrieved on Sep. 12, 2019) p. 162-165.
Co-pending U.S. Appl. No. 16/015,340, filed Jun. 22, 2018.

* cited by examiner

MEASUREMENT PLATFORM THAT AUTOMATICALLY DETERMINES WEAR OF MACHINE COMPONENTS BASED ON IMAGES

RELATED APPLICATION

This application is a continuation of U.S. patent application Ser. No. 16/015,340, filed Jun. 22, 2018, which is incorporated herein by reference.

TECHNICAL FIELD

The present disclosure relates generally to a wear measurement system, and, more particularly, to a measurement platform that automatically determines wear of machine components based on images.

BACKGROUND

Earth-working machines, such as excavators, continuous miners, and loaders, often include ground engaging work tools that engage with and/or move a variety of earthen materials. The machines include tracked undercarriages that facilitate movement of the machines over ground surfaces, and other moving parts that may engage with the ground surfaces and/or earthen materials. Repeated exposure to hard earthen materials and/or the ground surfaces may cause one or more components of these machines to wear.

Conventional techniques for detecting wear on the machine components include manual measurements of component dimensions, which may be compared against specified dimensions of the components. Such manual measurements are not only time consuming but also can be inaccurate. Inaccurate measurements of component dimensions, in turn, may result in incorrect predictions regarding a remaining life of the component. As a result, the component may either fail too early or may not be worn enough to require replacement or repair when the machine is removed from service for maintenance. Thus, there is a need for accurate measurement of component dimensions on a machine in a work environment to allow for improved component life predictions, which may help reduce a down time associated with repair or replacement of worn out components.

One attempt to provide accurate measurement of component dimensions on a machine is disclosed in U.S. Pat. No. 9,875,535 that was issued to Finch et al. on Jan. 23, 2018 ("the '535 patent"). In particular, the '535 patent discloses a wear measurement system that includes an imaging device configured to obtain two-dimensional images of a component. The wear measurement system may generate a three-dimensional point cloud representing the component based on the two-dimensional images, and may select at least two reference points appearing in each of a subset of images selected from the two-dimensional images. The wear measurement system may determine locations of the two reference points in the three-dimensional point cloud, and may determine a distance between the locations. The wear measurement system may determine an amount of wear of the component based on the distance.

While the wear measurement system of the '535 patent discloses determining wear of machine components based on images, the wear measurement system may not be completely automatic and may require manual selection (e.g., by an operator) of scale features on an object of a known size (e.g., a tape measure) in several images. Furthermore, the wear measurement system may require manual selection (e.g. by an operator) of reference points in several images. For example, the operator may manually select center points of pins that connect adjacent links of an undercarriage of a machine.

Automating the manual approach to selecting the scale features and the reference points in images is difficult. For example, automatically selecting the scale features on a machine component is very challenging due to lighting, dirt, and customization issues. Even if the scale features could be automatically selected, measurement error scales linearly with a scale error and features on the machine component may not be controlled to a millimeter level during manufacturing.

The measurement platform of the present disclosure solves one or more of the problems set forth above and/or other problems in the art.

SUMMARY

In one aspect, the present disclosure is related to a device that may include one or more memory devices, and one or more processors, operatively coupled to the one or more memory devices, to receive images associated with a component. The one or more processors may receive a three-dimensional model of the component, and may generate an image point cloud based on the images. The one or more processors may generate a model point cloud based on the three-dimensional model of the component, and may perform a first alignment of the image point cloud and the model point cloud to generate first-aligned point clouds. The one or more processors may perform a second alignment of the first-aligned point clouds to generate second-aligned point clouds, and may generate three-dimensional mask regions based on the second-aligned point clouds. The one or more processors may project the three-dimensional mask regions on one or more of the images, and may process the three-dimensional mask regions, projected on the one or more of the images, to determine reference points in the images. The one or more processors may determine an amount of wear associated with the component based on the reference points.

In another aspect, the present disclosure is related to a non-transitory computer-readable medium storing instructions that may include one or more instructions that, when executed by one or more processors of a device, cause the one or more processors to receive images associated with a component. The one or more instructions may cause the one or more processors to generate an image point cloud based on the images, and generate a model point cloud based on a three-dimensional model of the component. The one or more instructions may cause the one or more processors to perform a first alignment of the image point cloud and the model point cloud to generate first-aligned point clouds, and perform a second alignment of the first-aligned point clouds to generate second-aligned point clouds. The one or more instructions may cause the one or more processors to generate mask regions based on the second-aligned point clouds, and project the mask regions on one or more of the images. The one or more instructions may cause the one or more processors to process the mask regions, projected on the one or more of the images, to determine reference points in the images, and project the reference points in the image point cloud. The one or more instructions may cause the one or more processors to determine locations of at least two of the reference points projected in the image point cloud, and determine an amount of wear associated with the component based on the locations. The one or more instructions may cause the one or more processors to perform an action based on the amount of wear associated with the component.

In yet another aspect, the present disclosure is related to a method that may include receiving, by a device, images associated with a component of a machine, and generating, by the device, an image point cloud based on the images. The method may include generating, by the device, a model point cloud based on a three-dimensional model of the component, and performing, by the device, a first alignment and scaling of the image point cloud and the model point cloud to generate first-aligned point clouds. The method may include performing, by the device, a second alignment and scaling of the first-aligned point clouds to generate second-aligned point clouds, and generating, by the device, mask regions based on the second-aligned point clouds. The method may include projecting, by the device, the mask regions on the images, and processing, by the device, the mask regions, projected on the images, to determine reference points in the images. The method may include projecting, by the device, the reference points in the image point cloud, and identifying, by the device, locations of at least two of the reference points projected in the image point cloud. The method may include calculating, by the device, an image distance between the locations, and determining, by the device, an amount of wear associated with the component based on the image distance.

DETAILED DESCRIPTION

Figure 1:
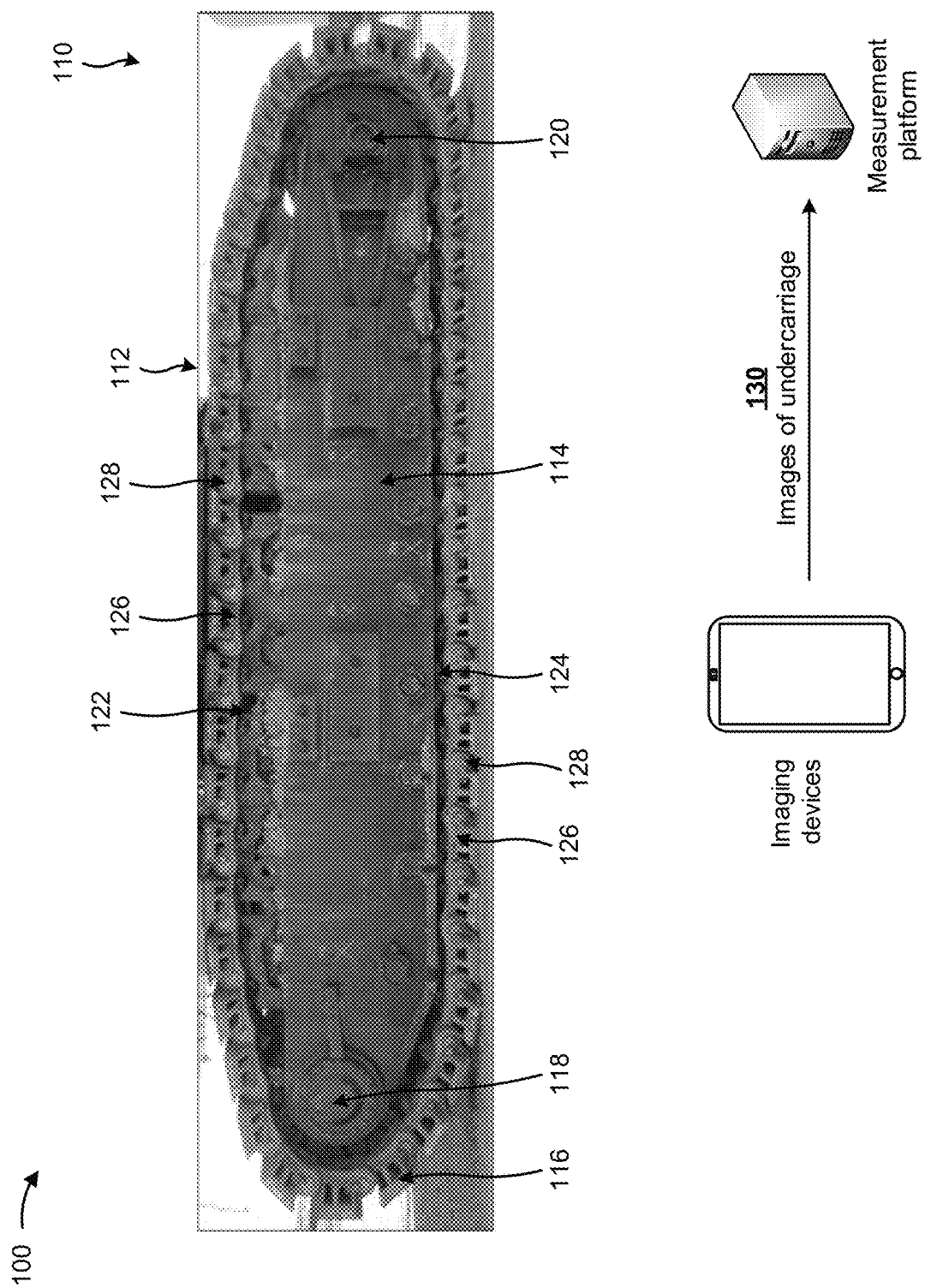
FIGS. 1-11 are diagrams of example implementations of a measurement platform for measuring wear of machine components.

This disclosure relates to a measurement platform that automatically determines wear of machine components based on images. The measurement platform has universal applicability to any machine with components that experience wear.

FIGS. 1-11 are diagrams of example implementations of a measurement platform for measuring wear of machine components. As shown in example implementation 100 of FIG. 1, a machine 110, that includes an undercarriage 112, may be associated with imaging devices for capturing images of undercarriage 112 and a measurement platform for measuring wear of undercarriage 112. In some implementations, undercarriage 112 may be used to propel machine 110 in a forward or rearward direction. In some implementations, machine 110 may perform some type of operation associated with an industry such as construction, mining, forestry, and/or the like. In some implementations, machine 110 may include a loader, a bulldozer, an excavator, a tractor, a continuous mining machine, a tank, and/or other machines with track-type traction devices.

In some implementations, undercarriage 112 may be configured to support machine 110 and may engage the ground, roads, and/or other types of terrain. Undercarriage 112 may include, among other things, a frame 114, a track 116, a sprocket cover 118, an idler wheel 120, one or more upper rollers 122, and one or more lower rollers 124. In some implementations, undercarriage 112 may include one or more sliders in place of or in addition to upper rollers 122. Sprocket cover 118, idler wheel 120, upper rollers 122, and lower rollers 124 may be attached to frame 114 of undercarriage 112. Track 116 may wrap around sprocket cover 118, idler wheel 120, upper rollers 122, and lower rollers 124 to form an endless chain. In some implementations, track 116 may include multiple individual links 126 connected end-to-end via pins 128.

In some implementations, sprocket cover 118 and idler wheel 120 may be located on opposite ends of undercarriage 112. For example, as shown in FIG. 1, idler wheel 120 may be located adjacent to a front end of frame 114, and sprocket cover 118 may be located adjacent to a rear end of frame 114. Sprocket cover 118 may include one or more projections (or teeth) that engage with track 116 and transfer tractive forces from sprocket cover 118 to track 116. Sprocket cover 118 may be rotated by a power source of machine 110, such as a gasoline engine, a diesel engine, an electric engine, a natural gas engine, a hybrid-powered engine, and/or the like. In some implementations, the power source may deliver power output to a generator, which may in turn drive one or more electric motors coupled to sprocket cover 118. In some implementations, the power source may deliver power output to a hydraulic motor fluidly coupled to a hydraulic pump and configured to convert a fluid pressurized by the pump into a torque output, which may be directed to sprocket cover 118.

In some implementations, upper rollers 122 and lower rollers 124 may guide track 116 between sprocket cover 118 and idler wheel 120. For example, upper rollers 122 may extend upward from frame 114 and engage an inner portion of links 126 in order to guide track 116 at an upper track side of frame 114. Lower rollers 124 may guide track 116 at a lower track side of frame 114. Lower rollers 124 may be suspended from frame 114, and may ride on and guide links 126 as track 116 travels around sprocket cover 118 and idler wheel 120.

In some implementations, the imaging devices may be configured to capture two-dimensional (2D) images of machine 110 and/or undercarriage 112. In some implementations, the imaging devices may include a single imaging device that may be located at different positions to allow the imaging device to take multiple two-dimensional images of machine 110 and/or undercarriage 112 from different positions and orientations. In some implementations, the imaging devices may be located at the different positions to allow the imaging device to take the multiple two-dimensional images of machine 110 and/or undercarriage 112 from the different positions and orientations.

As further show in FIG. 1, and by reference number 130, the measurement platform may receive images of undercarriage 112 from the imaging devices. In some implementations, the measurement platform may store the images of undercarriage 112 in a memory (e.g., in a database) associated with the measurement platform. In some implementations, each image may include a two-dimensional view of undercarriage 112. In some implementations, images may include a two-dimensional video of undercarriage 112, including views from different camera positions and/or orientations. In some implementations, the measurement platform may process the images of undercarriage 112 to determine wear associated with one or more components of undercarriage 112, as described below.

Figure 2:
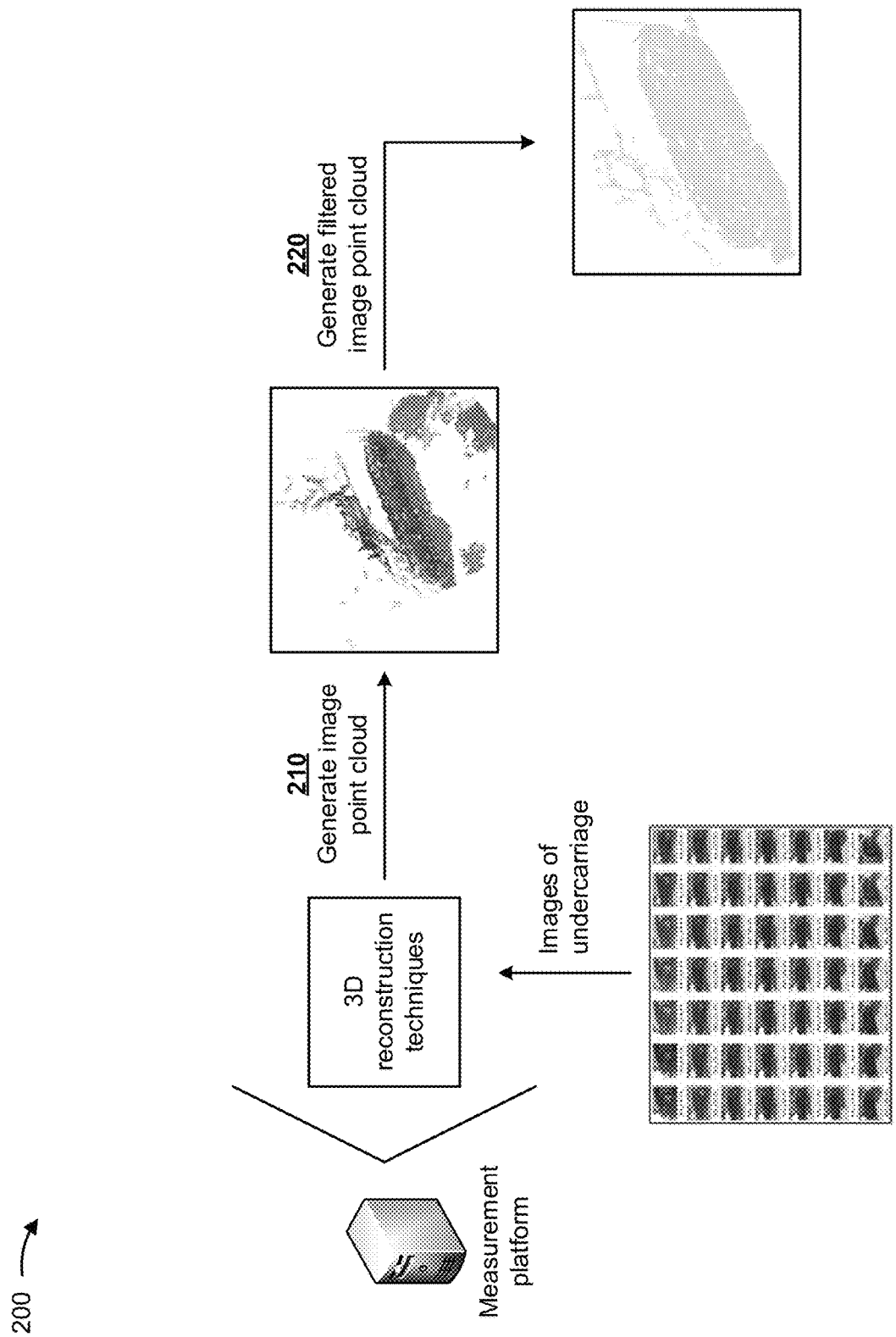

As shown in example implementation 200 of FIG. 2, and by reference number 210, the measurement platform may process images 130 of undercarriage 112, with three-dimensional reconstruction techniques, to generate a three-dimensional image point cloud. In some implementations, when images 130 include a two-dimensional video of undercarriage 112, the measurement platform may extract two-dimensional images of undercarriage 112 from the two-dimensional video.

In some implementations, the two-dimensional images 130 may correspond to the different positions of the imaging device. In such implementations, the measurement platform may determine the positions, and orientations of the imaging device at each of the positions, in a coordinate system. The positions and orientations of the imaging device may constitute poses of the imaging device, and the measurement platform may determine the poses of the imaging device at each of the positions based on a comparison of relative positions of matching features that appear in each of the two-dimensional images 130. In some implementations, the measurement platform may determine the positions of the features in the two-dimensional images 130 using triangulation techniques. In some implementations, the measurement platform may sequentially refine the positions of the features in the two-dimensional images 130 by updating the positions as each two-dimensional image 130 is processed.

In some implementations, the measurement platform may select matching features in the two-dimensional images 130. The matching features may include one or more distinguishable features of an imaged component. For example, in the two-dimensional images 130 of undercarriage 112, the matching features may include pins 128 connecting adjacent links 126 of track 116, sprocket cover 118, idler wheel 120, upper rollers 122, lower rollers 124, and/or the like. In some implementations, the measurement platform may use feature matching techniques to automatically identify and select the matching features in each of two-dimensional images 130. For example, the measurement platform may perform a comparison of a portion of, or an entirety of the two-dimensional images 130, with images of features stored in a memory associated with the measurement platform, to identify the matching features in each of two-dimensional images 130. In some implementations, the feature matching techniques may include automated keypoint identification (ID) and matching across image. The keypoints may be anonymous (e.g., no information is provided about to which part or wear feature the keypoints correspond), and may be mathematically unique. The keypoints may be located and matched in multiple images and subsequently placed in a three-dimensional space during reconstruction of a three-dimensional scene.

In some implementations, the measurement platform may generate the three-dimensional point cloud using triangulation and optimization techniques. For example, the measurement platform may generate the three-dimensional point cloud based on the poses (e.g., the positions and the orientations) of the imaging device and the relative positions of the matching features in the two-dimensional images 130.

In some implementations, the measurement platform may utilize matched keypoints in multiple images to solve a multi-layer optimization. The multi-layer optimization may solve for three-dimensional locations of the matched keypoints, locations (e.g., x, y, and z) of camera centers for each image taken, rotations of the cameras (e.g., $r_x$, $r_y$, $r_z$) of the camera at each camera location, and a camera model (e.g., focal lengths and lens distortion coefficients), and/or the like. The measurement platform may utilize this fundamental understanding of the three-dimensional scene to identify the wear features in the images and to triangulate the wear features back into space for measurement. The recreated points from the three-dimensional reconstruction may be unlabeled (e.g., no information is known about to which what parts the keypoints correspond).

In some implementations, any quantity of the two-dimensional images 130 at any quantity of the positions, and any quantity of the features may be used to generate three-dimensional point cloud using the two-dimensional images 130. In some implementations, locations in the three-dimensional point cloud may appear as point representations of corresponding features. In some implementations, the three-dimensional point cloud may not include continuous edges, but may instead include a cluster of locations representing discrete reference points in the two-dimensional images 130. As a result, the three-dimensional point cloud may be an image that includes a cloud of points representing locations of discrete reference points in the two-dimensional images 130.

As further shown in FIG. 2, and by reference number 220, the measurement platform may process the image point cloud, with a filter, to generate a filtered image point cloud. In some implementations, the filter may filter the image point cloud to remove points that are not part of the undercarriage. Since it is unknown which points correspond to which features in the scene, the measurement platform may filter the image point cloud by utilizing the fact that images of the undercarriage, on average, may include more three-dimensional undercarriage points reconstructed than otherwise. In some implementations, the measurement platform may utilize a mixed Gaussian-based filter that fits points to a quantity (e.g., n) of distinct statistical distributions. The measurement platform may store points associated with a densest distribution given that, on average, these points may correspond to undercarriage points since the points were derived from images of the undercarriage.

Figure 3:
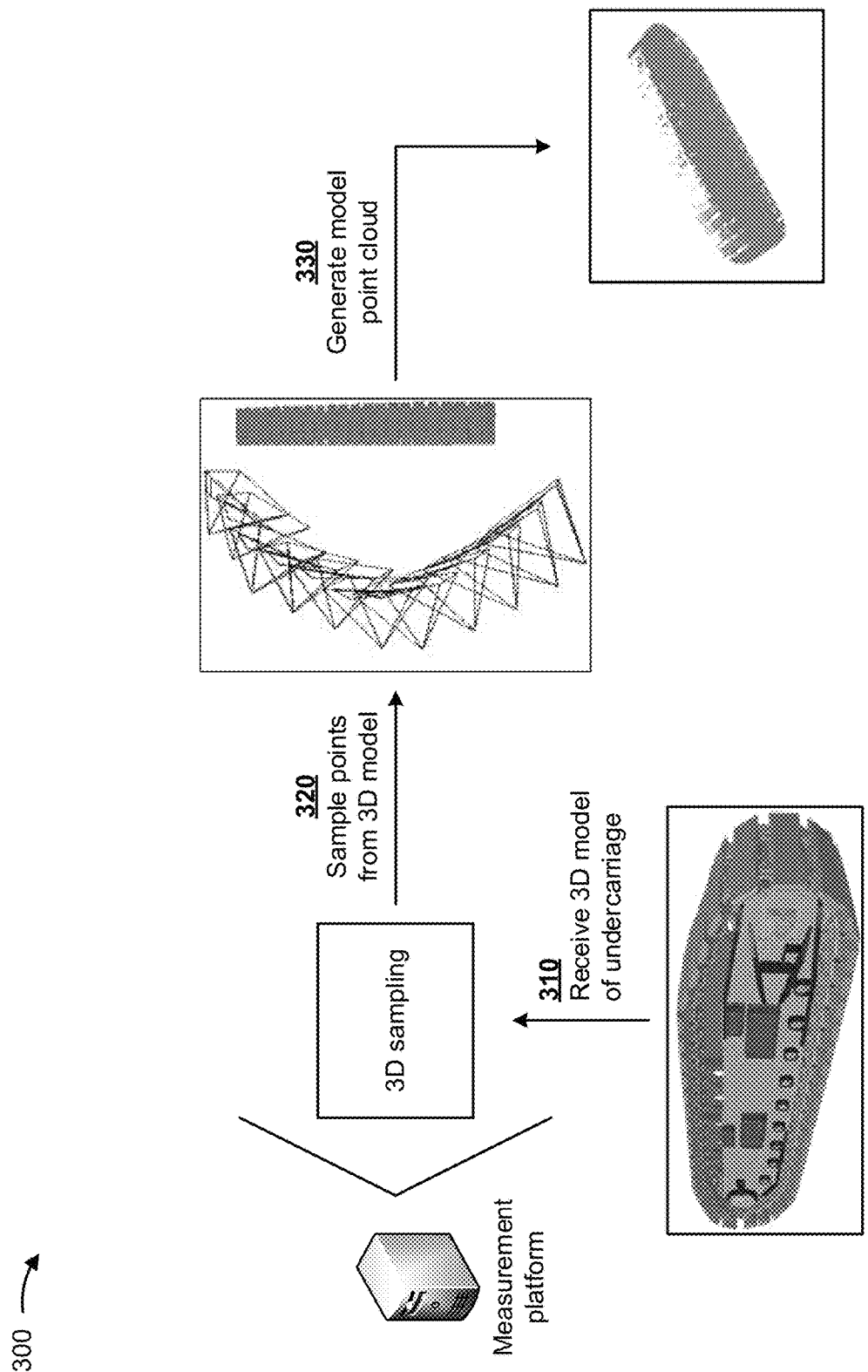

As shown in example implementation 300 of FIG. 3, and by reference number 310, the measurement platform may receive a three-dimensional model of undercarriage 112. In some implementations, the three-dimensional model of undercarriage 112 may include a three-dimensional computer-aided design (CAD) model of undercarriage 112, which may be used to manufacture undercarriage 112.

As further shown in FIG. 3, and by reference numbers 320 and 330, the measurement platform may sample points from the three-dimensional model, and may generate a three-dimensional model point cloud based on sampling the points from the three-dimensional model. In some implementations, the measurement platform may provide the three-dimensional model in a three-dimensional scene, and may provide synthetic cameras in the three-dimensional scene. A synthetic camera may include a rendering technique that seeks to replicate characteristics (e.g., distortions, such as out of focus, aberration, and/or the like) of a real camera or the human eye, rather than perfectly sharp achromatic pictures produced by computer graphics. In some implementations, an image array of the synthetic camera may project rays to the three-dimensional model to generate a point in space without utilizing the rendering technique. The measurement platform may solve for a camera model and may undistort the images before performing a keypoint identification (ID) and matching process. In some implementations, the synthetic cameras may be arranged in positions, relative to the three-dimensional model, similar to the imaging devices relative to undercarriage 112. The measurement platform may project rays from camera arrays of each synthetic camera to the three-dimensional model, and may create the model point cloud, which is a combination of three-dimensional points derived from each synthetic camera location.

Figure 4:
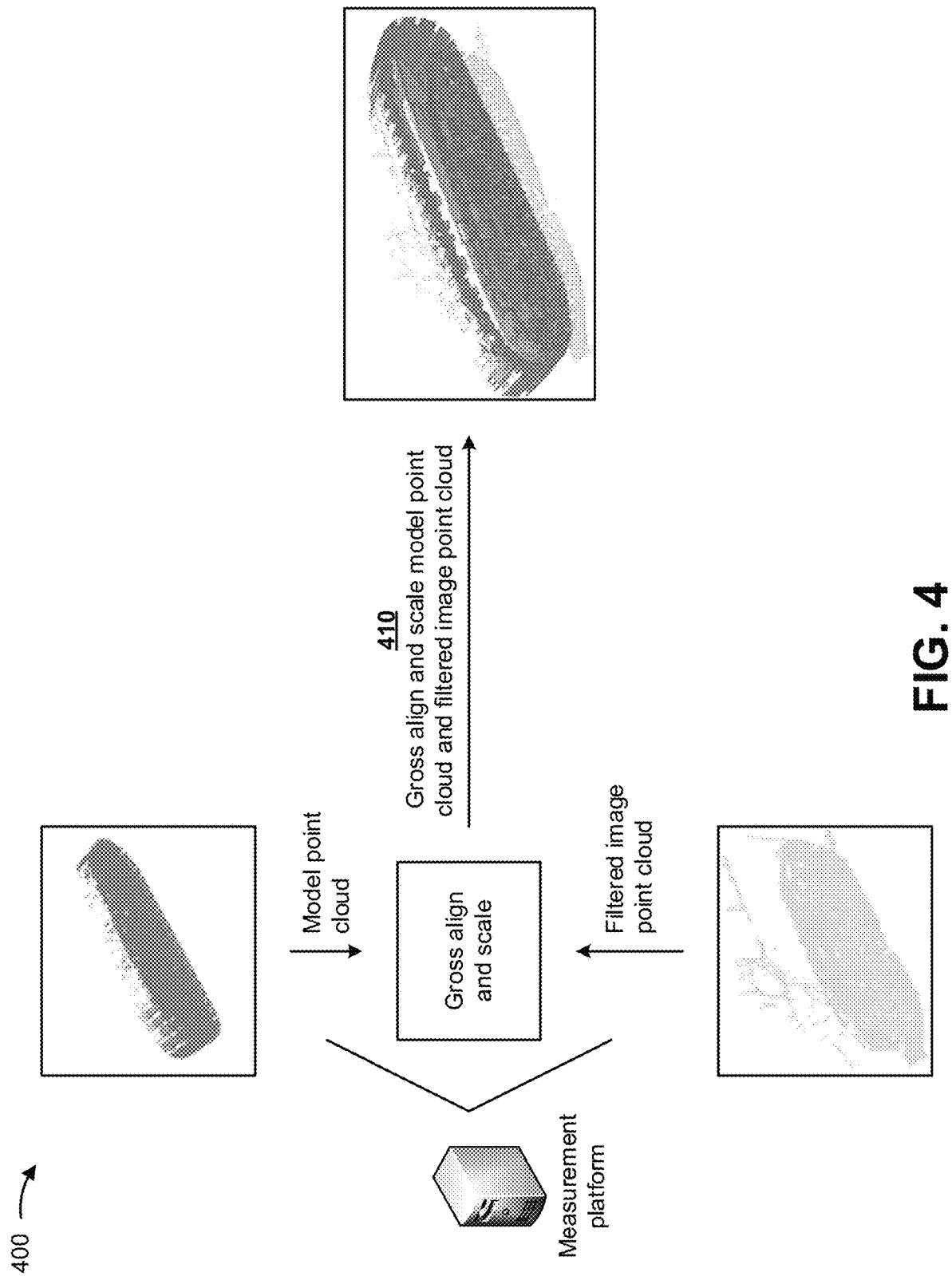

As shown in example implementation 400 of FIG. 4, and by reference number 410, the measurement platform may process the model point cloud to grossly align and scale the model point cloud and the filtered image point cloud. In some implementations, the gross alignment and scaling of the model point cloud and the filtered point cloud may be imperfect since undercarriage 112 may include worn components that cause track 116 to sag and not align with a track provided in the model point cloud. For example, the gross alignment and scaling of the model point cloud and the filtered point cloud may provide a particular scale value (e.g., 3.255) with a particular scale error (e.g., 12%) from a known or ground truth scale value (e.g., 3.685).

In some implementations, the measurement platform may utilize a principal component analysis to grossly align and scale the model point cloud and the filtered image point cloud. A principal component analysis may include a statistical analysis that uses an orthogonal transformation to convert a set of observations of possibly correlated variables into a set of values of linearly uncorrelated variables called principal components. For example, if there are n observations with p variables, then a number of distinct principal components is min (n−1, p). This transformation is defined in such a way that a first principal component has a largest possible variance (that is, accounts for as much of the variability in data as possible), and each succeeding component in turn has a highest variance possible under a constraint that it is orthogonal to the preceding components. The resulting vectors provide an uncorrelated orthogonal basis set.

Figure 5:
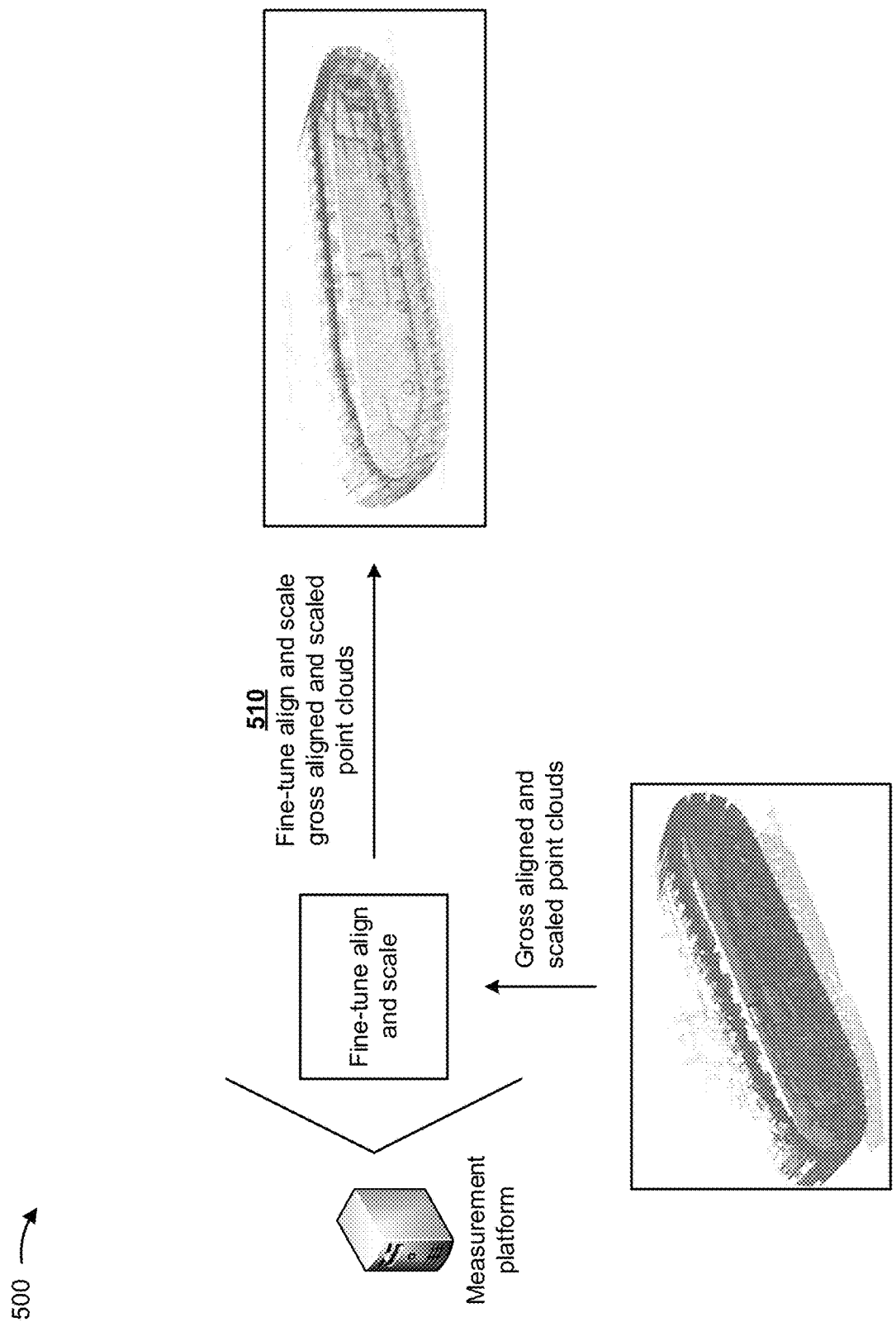

As shown in example implementation 500 of FIG. 5, and by reference number 510, the measurement platform may process the grossly aligned and scaled model point cloud and filtered image point cloud (e.g., gross aligned and scaled point clouds) to fine-tune align and scale the gross aligned and scaled point clouds. In some implementations, the fine-tune alignment and scaling of the gross aligned and scaled point clouds may be performed based on components of undercarriage 112 that do not wear or wear over a long period of time (e.g., frame 114, sprocket cover 118, and/or the like). Thus, the fine-tune alignment and scaling of the gross aligned and scaled point clouds may provide a much-improved alignment than the gross alignment and scaling of the model point cloud and the filtered image point cloud. For example, the fine-tune alignment and scaling of the gross aligned and scaled point clouds may provide a particular scale error (e.g., 0.01%) that is much less than the particular scale error (e.g., 12%) associated with the gross alignment and scaling of the model point cloud and the filtered point cloud. The fine-tune alignment and scaling of the gross aligned and scaled point clouds may also provide a particular scale value (e.g., 3.683) that is more accurate than the particular scale value (e.g., 3.255) associated with the gross alignment and scaling of the model point cloud and the filtered point cloud when compared to the known scale value (e.g., 3.685).

In some implementations, the measurement platform may utilize an iterative closest point technique to fine-tune align and scale the gross aligned and scaled point clouds. An iterative closest point technique may minimize a difference between two point clouds. In the iterative closest point technique, one point cloud (i.e., a vertex cloud or a reference cloud) is kept fixed, while the other point cloud is transformed to best match the reference. The iterative closest point technique iteratively revises the transformation (e.g., with a combination of translation and rotation) needed to minimize an error metric, which may be a distance from a source to the reference cloud, such as a sum of squared differences between coordinates of matched pairs. The iterative closest point technique may be used to reconstruct two-dimensional or three-dimensional surfaces from different scans, may be used to align three-dimensional models given an initial guess of a rigid body transformation, and/or the like.

Figure 6:
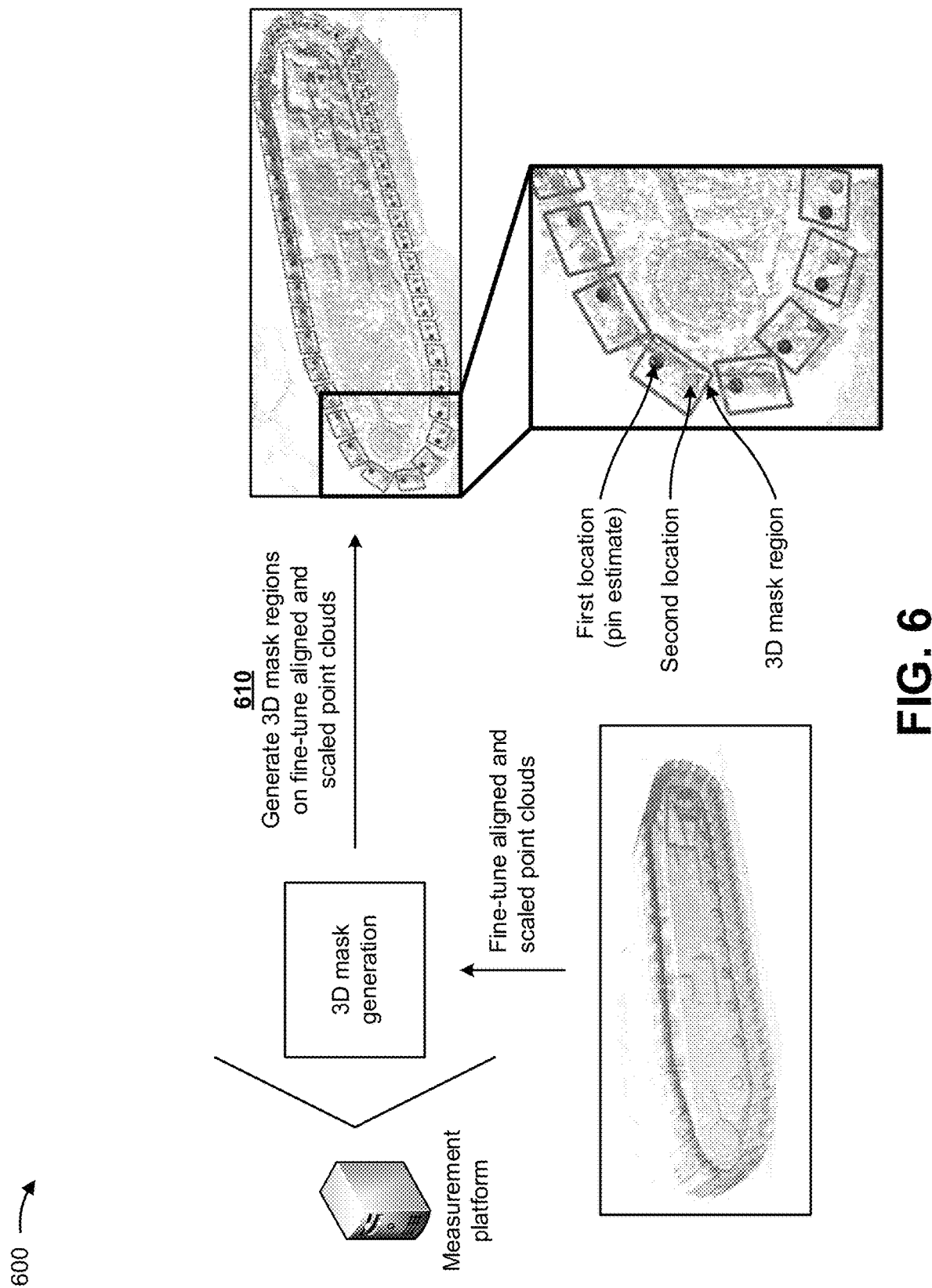

As shown in example implementation 600 of FIG. 6, and by reference number 610, the measurement platform may process the fine-tune aligned and scaled model point cloud and filtered image point cloud (e.g., fine-tune aligned and scaled point clouds) to generate three-dimensional mask regions on the fine-tune aligned and scaled point clouds. In some implementations, the three-dimensional mask regions may narrow a search, in the original two-dimensional images 130, for pins 128 that connect links 126 of track 116 of undercarriage 112, as described below. In some implementations, the final fine-tune alignment may provide estimates of wear features (e.g., pins) in three-dimensional space based solely on three-dimensional model locations after the fit (e.g., a first location, as shown in FIG. 6). The measurement platform may generate the three-dimensional mask region based on this first location since a size and a location in space may be calculated to provide near statistical certainty that one, and only one, real pin or other wear feature is in the region. The measurement platform may re-project the region onto the images, may locate real pins/wear features, and may calculate the real pin location (e.g., a second location as shown in FIG. 6). The measurement platform may define the three-dimensional mask regions for the remaining pins 128 in a similar manner.

Figure 7:
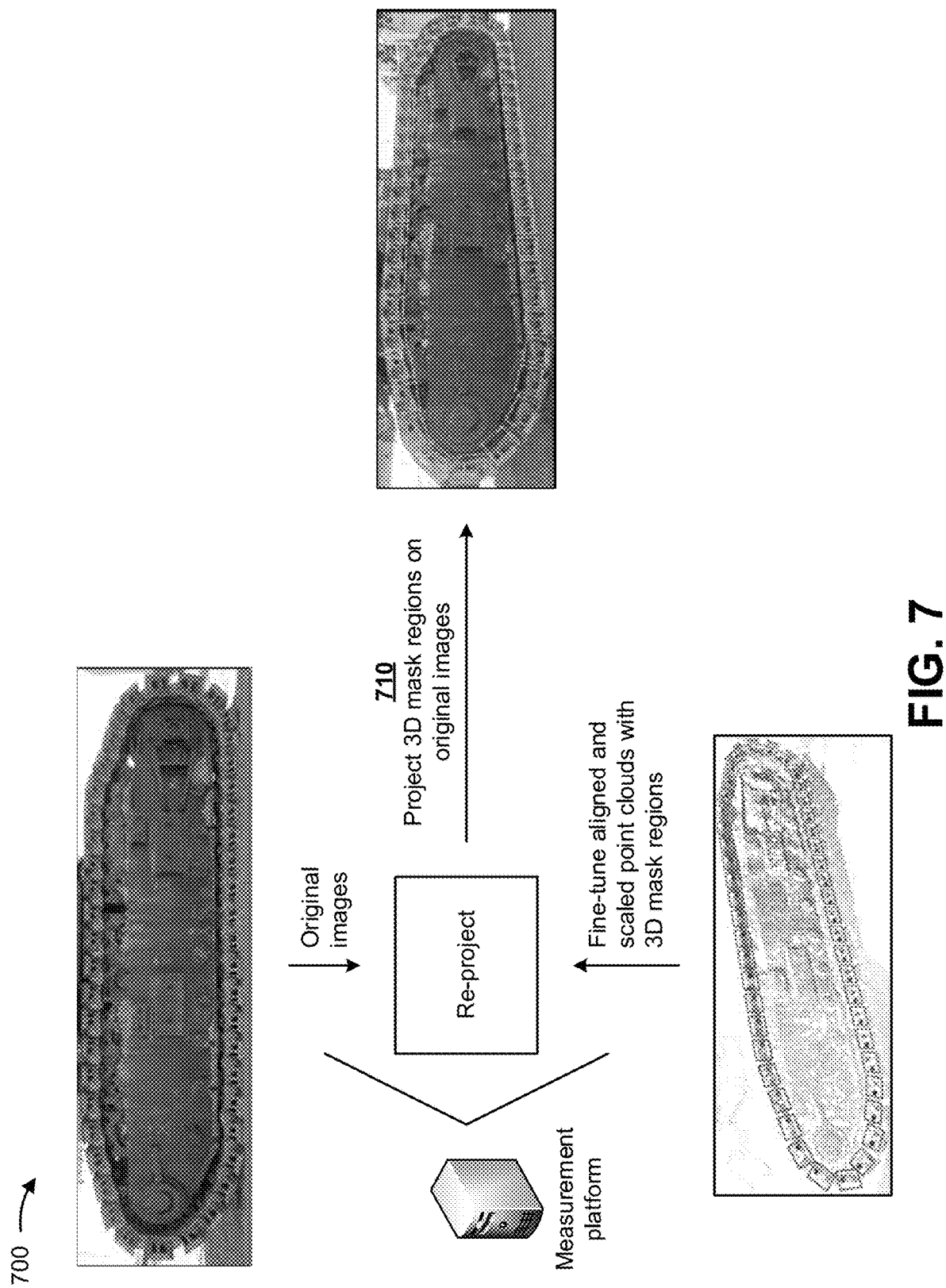

As shown in example implementation 700 of FIG. 7, and by reference number 710, the measurement platform may project the three-dimensional mask regions on one or more of the original two-dimensional images 130 of undercarriage 112. In some implementations, the measurement platform may utilize the fine-tune aligned and scaled point clouds, with the three-dimensional mask regions, to project the three-dimensional mask regions on one or more of the original two-dimensional images 130 of undercarriage 112.

Figure 8:
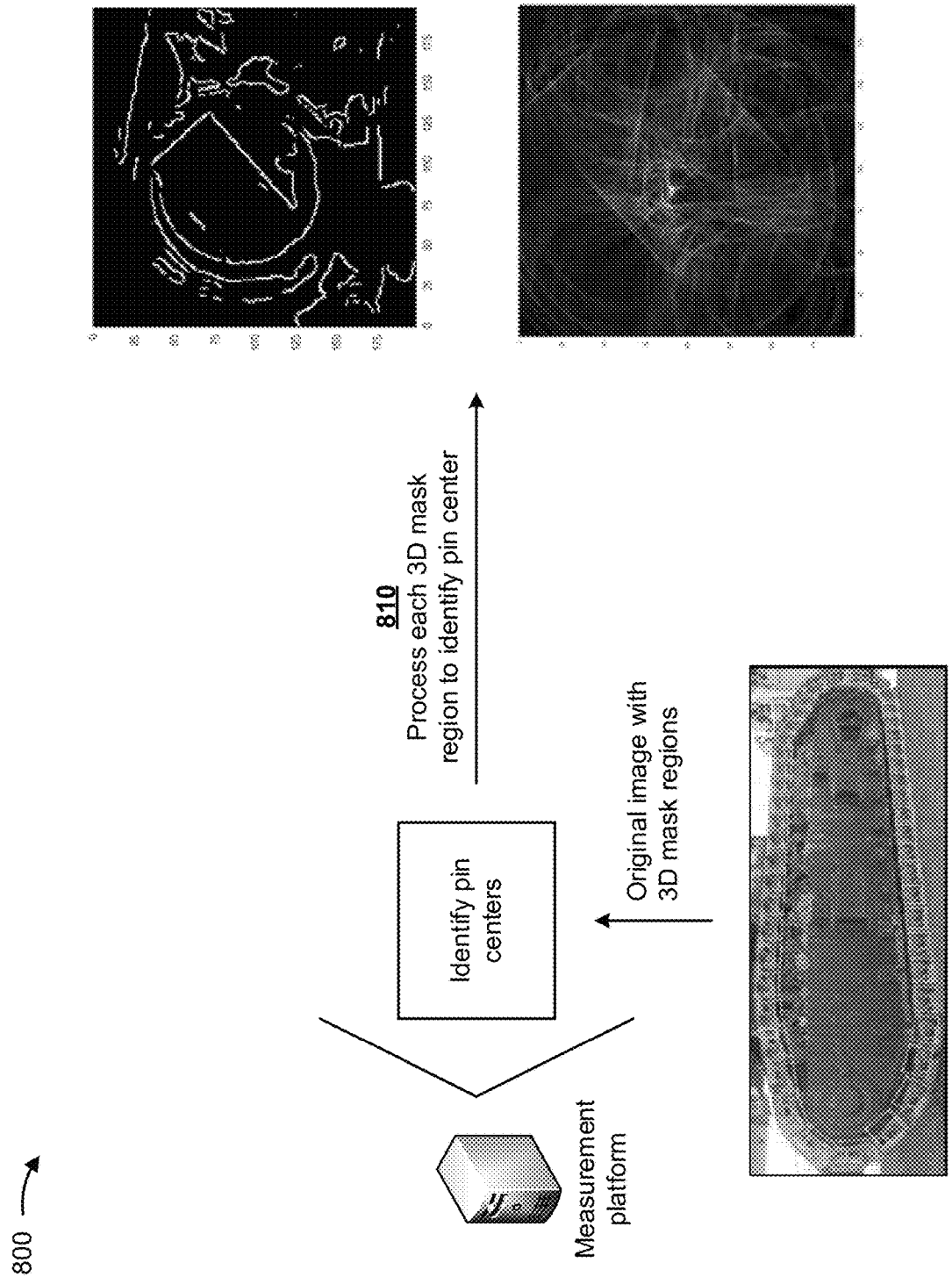

As shown in example implementation 800 of FIG. 8, and by reference number 810, the measurement platform may process each of the three-dimensional mask regions, projected on an original image, to identify a reference point (e.g., a center of a pin 128) associated with each three-dimensional mask region. In some implementations, the measurement platform may process each three-dimensional mask region, with an edge detection method, to identify edges in each three-dimensional mask region. In some implementations, the edge detection method may include a Canny edge detection method, mask regional convolutional neural network (R-CNN) edge detection method, a fast R-CNN edge detection method, a faster R-CNN edge detection method, a region-based fully convolutional networks (R-FCN) edge detection method, and/or the like. In some implementations, the measurement platform may back project the three-dimensional masks onto the images to define two-dimensional regions of interest, and may process the two-dimensional regions to locate reference points via the Canny edge detection method, a Hough transform method (e.g., described below), a R-CNN edge detection method, and/or the like. In some implementations, the measurement platform may provide reference point localization based on standard image processing techniques, machine learned detectors, and/or the like. In some implementations, the measurement platform may utilize the Canny edge detection method to determine edges, and may utilize the Hough transform method to determine a best candidate point that is a center of a circle.

The Canny edge detection method may extract useful structural information from different vision objects and dramatically reduce an amount of data to be processed in an image. The Canny edge detection method may apply a Gaussian filter to smooth an image in order to remove noise, determine intensity gradients of the image, apply non-maximum suppression to remove spurious response to edge detection, apply a double threshold technique to determine potential edges, and apply edge tracking by hysteresis to suppress weak edges that are not connected to strong edges.

The fast R-CNN edge detection method may include an object detection deep learning model based on a R-CNN method that improves on a detection speed of a R-CNN method. The R-CNN method scans an input image for possible objects using a selective search method, generates region proposals, applies a CNN to each of the region proposals, and provides the output of each CNN to a support vector machine (SVM), and to a linear regressor, to classify each region based on the extracted features. The fast R-CNN method improves on the detection speed of a R-CNN method by performing feature extraction over an entire original image before proposing regions, thus applying one CNN to the entire image instead of to a number of CNNs over a corresponding number of overlapping regions. The R-CNN method applies the output of the one CNN to a single softmax layer that outputs class probabilities, thus extending a neural network for predictions instead of creating a new model.

The faster R-CNN edge detection method may include an object detection deep learning model that improves on a fast R-CNN method by employing a region proposal networks (RPN) instead of a selective search method to generate region proposals. In the faster R-CNN model, at a last layer of an initial CNN, a sliding window moves across a feature map and maps the feature map to a lower dimension. For each sliding-window location, the RPN generates multiple possible regions based on k fixed-ratio anchor boxes (default bounding boxes). Each region proposal includes an objectness score for the region (representing a likelihood that the region contains an object) and coordinates representing the bounding box of the region. If the objectness score satisfies a threshold, the coordinates are passed forward as a region proposal.

The mask R-CNN edge detection method may include an edge detection method that extends the faster R-CNN method by adding a process for predicting an object mask in parallel with an existing process for bounding box recognition. The added process outputs a binary mask that indicates whether a given pixel is part of an object or not part of the object.

The R-FCN edge detection method may include an object detection deep learning model that applies position-sensitive score maps to a fully convolutional network. Each position-sensitive score map represents one relative position of one object class (e.g., an upper right portion of a particular type of object). The R-FCN method applies a CNN to an input image, adds a fully convolutional layer to generate a score bank of position sensitive score maps, and applies a RPN to generate regions of interest. The R-FCN method divides each region of interest into subregions, applies the score bank to determine whether each subregion matches a corresponding portion of an object, and classifies the region of interest based on, for example, whether matches satisfy a threshold.

In some implementations, the measurement platform may utilize one or more of the edge detection methods, and may utilize the best results determined by one of the edge detection methods. In some implementations, the measurement platform may utilize a plurality of the edge detection methods, and may aggregate the results determined by the plurality of edge detection methods.

In some implementations, the measurement platform may process the edges (e.g., determined by the edge detection method), with a feature extraction method, to determine the reference point (e.g., the center of a pin 128) associated with each three-dimensional mask region. In some implementations, the feature extraction method may include a thresholding method, a connected-component labeling method, a template matching method, a Hough transform method, and/or the like.

The thresholding method may include a method of image segmentation that employs a non-linear operation to convert a gray-scale image into a binary image where two different levels are assigned to pixels associated with a value that is below or above a specified threshold value. For example, the thresholding method may replace each pixel in an image with a black pixel if the image intensity is less than a threshold value, or with a white pixel if the image intensity is greater than the threshold value.

The template matching method may include a method for finding small parts of an image which match a template image. The template matching method employs an object recognition method that creates a small template of an object desired to be searched for in an image, and performs a pixel-by-pixel matching of the template with the image by placing the template at every possible position of a main image. The template matching method applies a similarity metric (e.g., normalized cross correlation) to identify a strongest match.

The Hough transform method may include a feature extraction method that isolates features of a particular shape within an image. The Hough transform method identifies imperfect instances of objects within a certain class of shapes by a voting procedure. The voting procedure is carried out in a parameter space, from which object candidates are obtained as local maxima in an accumulator space that is explicitly constructed by the method for computing the Hough transform.

In some implementations, the measurement platform may utilize one or more of the feature extraction methods, and may utilize the best results determined by one of the feature extraction methods. In some implementations, the measurement platform may utilize a plurality of the feature extraction methods, and may aggregate the results determined by the plurality of feature extraction methods.

Figure 9:
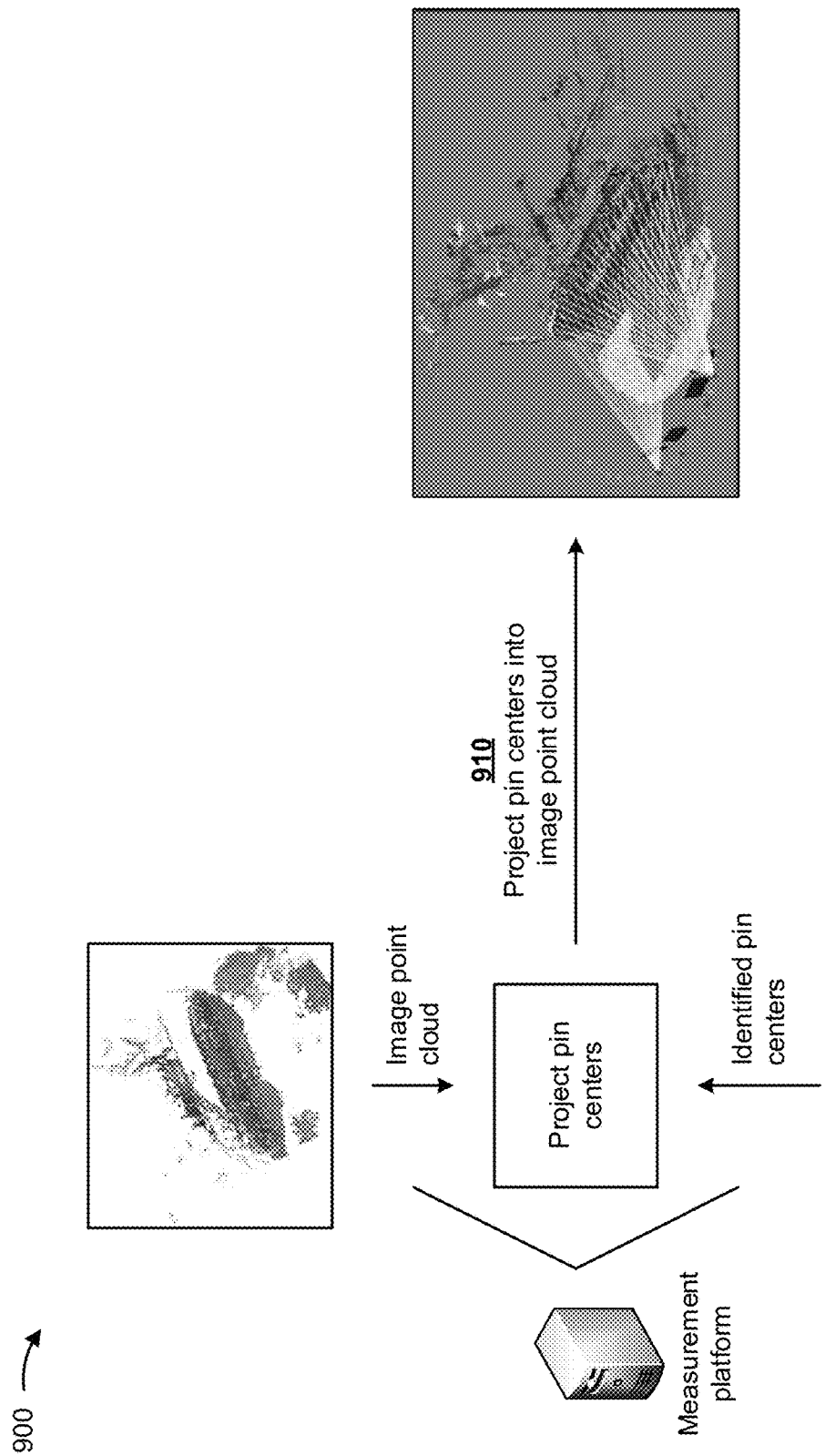

As shown in example implementation 900 of FIG. 9, and by reference number 910, the measurement platform may utilize the image point and the identified reference points (e.g., the pin centers) to project the pin centers into the image point cloud. In some implementations, the measurement platform may project lines (e.g., rays) from each of the positions (e.g., the positions of the imaging device used to capture the images 130 of undercarriage 112) through reference points (e.g., the pin centers) in each of the associated two-dimensional images 130. Thus, for example, the measurement platform may project a first ray from a first position through a reference point in a two-dimensional image. The measurement platform may similarly project a second ray from a second position through the reference point in the two-dimensional image 130. The measurement platform may repeat this process for other two-dimensional images 130.

In some implementations, the measurement platform may determine a location of the reference point in the image point cloud based on an intersection of rays and similar rays from other positions corresponding to other two-dimensional images 130. Because of potential differences in imaging conditions for the two-dimensional images 130 and inherent errors associated with imaging objects, the rays from the positions passing through the reference point may not converge at a single location in the three-dimensional image point cloud. In such cases, the measurement platform may determine the location of the reference point in the image point cloud as a position where a measure of distances between the rays passing through the reference point is less than a threshold distance. In some implementations, the measurement platform may repeat these steps for each of the reference points (e.g., the pin centers) to determine the locations of each of the reference points in the image point cloud.

Figure 10:
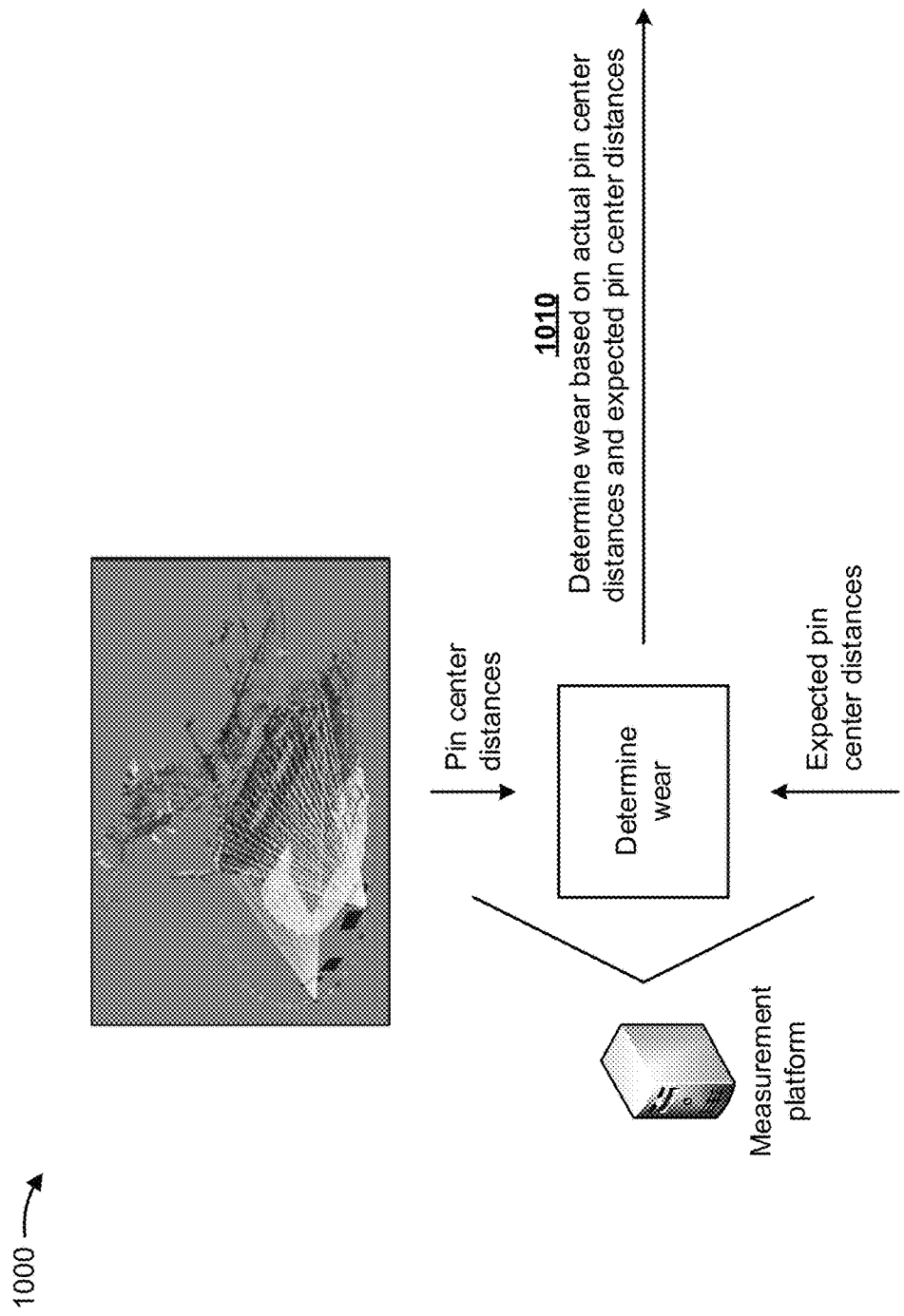

As shown in example implementation 1000 of FIG. 10, and by reference number 1010, the measurement platform may determine wear associated with a component of machine 110 (e.g., track 116, links 126, pins 128, and/or the like of undercarriage 112) based on actual pin center distances and expected pin center distances. In some implementations, the measurement platform may determine the actual pin center distances based on distances between the determined locations of the pin centers, as described above. The measurement platform may determine an image distance between the locations of the pin centers (e.g., a distance between locations on the image point cloud). In some implementations, the image distance may be different from an actual distance between the reference points on an actual undercarriage 112 of machine 110. In such implementations, the measurement platform may determine a scaling factor (e.g., the particular scale value of 3.683 described above in connection with FIG. 5) to convert the image or unscaled distance into an actual distance that would be observed on undercarriage 112.

In some implementations, the measurement platform may determine the expected pin center distances based on distances between pin centers provided in the three-dimensional model of undercarriage 112. In some implementations, the measurement platform may determine the wear associated with a component of machine 110 by comparing the actual pin center distances and the expected pin center distances. In some implementations, the measurement platform may determine an amount of pin wear as a difference between the expected pin center distances and the actual pin center distances. The measurement platform may determine an amount of wear associated with other components of machine 110 in a similar manner. In some implementations, instead of utilizing difference between two values to determine an amount of wear, the measurement platform may utilize ratios, absolute values, and/or other mathematical functions or operations on the actual distances and corresponding expected values to determine the amounts of wear on components of machine 110.

Figure 11:
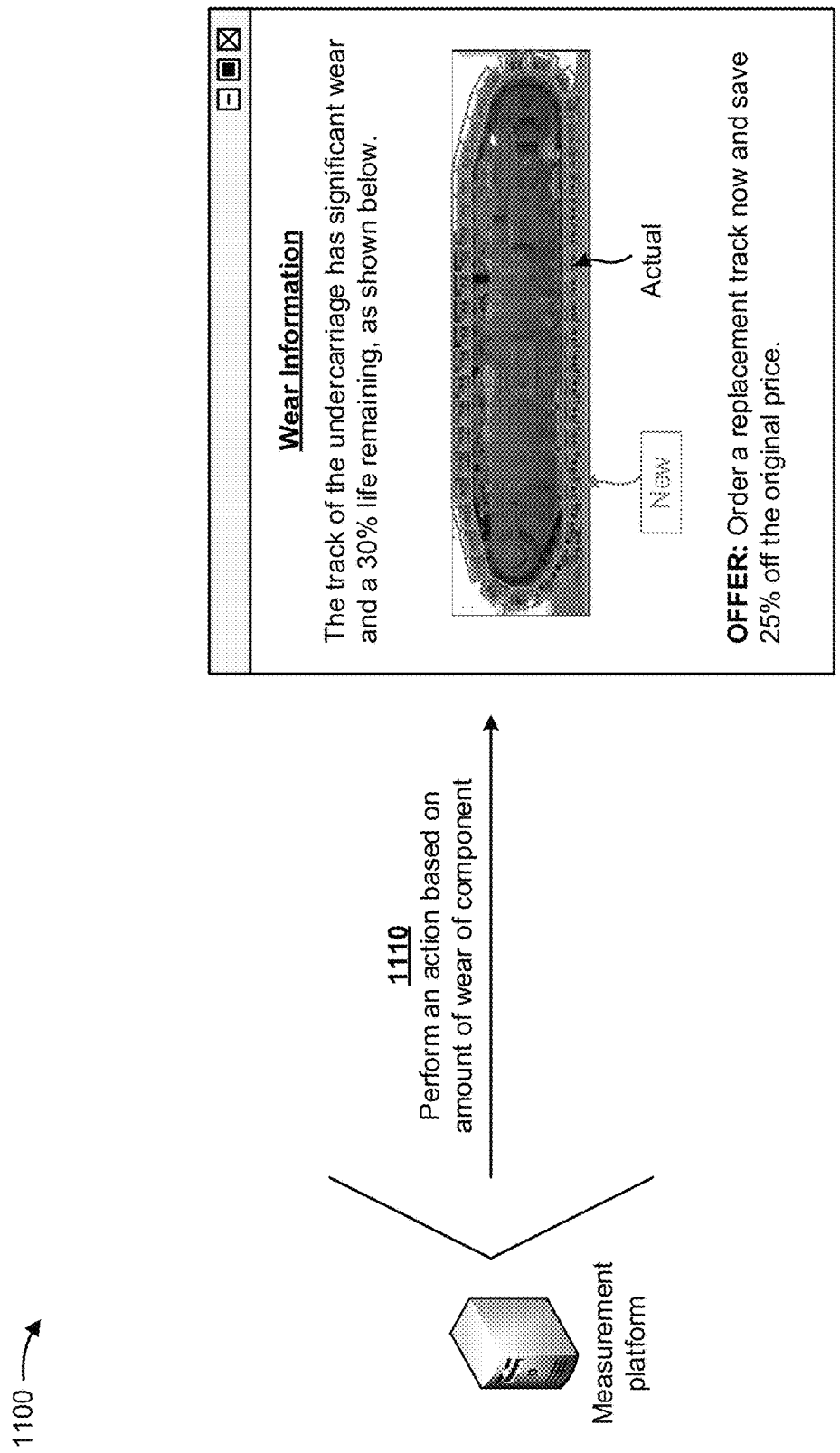

As shown in example implementation 1100 of FIG. 11, and by reference number 1110, the measurement platform may perform an action based on the amount of wear associated with the component of machine 110. In some implementations, the action may include the measurement platform providing, for display (e.g., to an operator of the measurement platform, to a device associated with a user of machine 110, and/or the like), information indicating an amount of wear associated with a component of machine 110. For example, as further shown in FIG. 11, the measurement platform may provide for display a user interface indicating that track 116 of undercarriage 112 has significant wear and a 30% life remaining.

In some implementations, the action may include the measurement platform automatically ordering a replacement component for the component, based on the amount of wear associated with the component. For example, the measurement platform may automatically reorder a replacement track 116 for machine 110. In some implementations, the action may include the measurement platform providing, for display (e.g., to a user of machine 110), an offer associated with a replacement component for the component. For example, as further shown in FIG. 11, the measurement platform may provide for display a user interface indicating an offer for a replacement track 116 (e.g., "Order a replacement track now and save 25% off the original price).

In some implementations, the action may include the measurement platform providing, for display (e.g., to a user of machine 110), an image of the component with an overlay of a model component provided by the three-dimensional model. For example, as further shown in FIG. 11, the measurement platform may provide for display a user interface that includes an image of actual track 116 of machine 110 with an overlay of a new track 116 in order to show the amount of wear of the actual track 116. In some implementations, the action may include the measurement platform providing, to a user of machine 110, an alert indicating the amount of wear of track 116 and possibly indicating dangers associated with utilizing a worn track 116.

In some implementations, the action may include the measurement platform automatically providing, to machine 110, an instruction that causes machine 110 to autonomously drive itself to a repair facility.

In some implementations, the action may include the measurement platform causing automatic delivery of the component of machine 110 to a location of machine 110. For example, the measurement platform may instruct a robot to load the component on an autonomous vehicle, which can deliver the component to the location of machine 110. Alternatively, the measurement platform may instruct a drone to deliver the component to the location of machine 110.

In some implementations, the measurement platform may predict when the component of machine 110 will fail based on the amount of wear associated with the component of machine 110. In such implementations, the measurement platform may determine a particular time to replace the component based on when the component is predicted to fail. If the measurement platform predicts that the failure of the component is not for a long time, the measurement platform may not perform an action. If the measurement platform predicts that the failure of the component is imminent, the measurement platform may perform one or more of the actions described above.

In some implementations, the measurement platform may estimate a scale of the image point cloud, and may automatically locate wear features to measure. When scaling and fitting two point clouds, the measurement platform may fix the image point cloud, and then may scale, rotate, and translate the model-based point cloud to obtain a best fit. The final amount of scaling applied to the model-based point cloud to obtain the best fit provides a final scene scale estimate and, similarly, a final position of the model-based features with respect to the image point cloud provides first estimates of wear feature locations, which may be leveraged to create masked regions to further drill down and locate highly accurate feature locations.

As indicated above, FIGS. 1-11 are provided merely as examples. Other examples are possible and may differ from what was described with regard to FIGS. 1-11.

Figure 12:
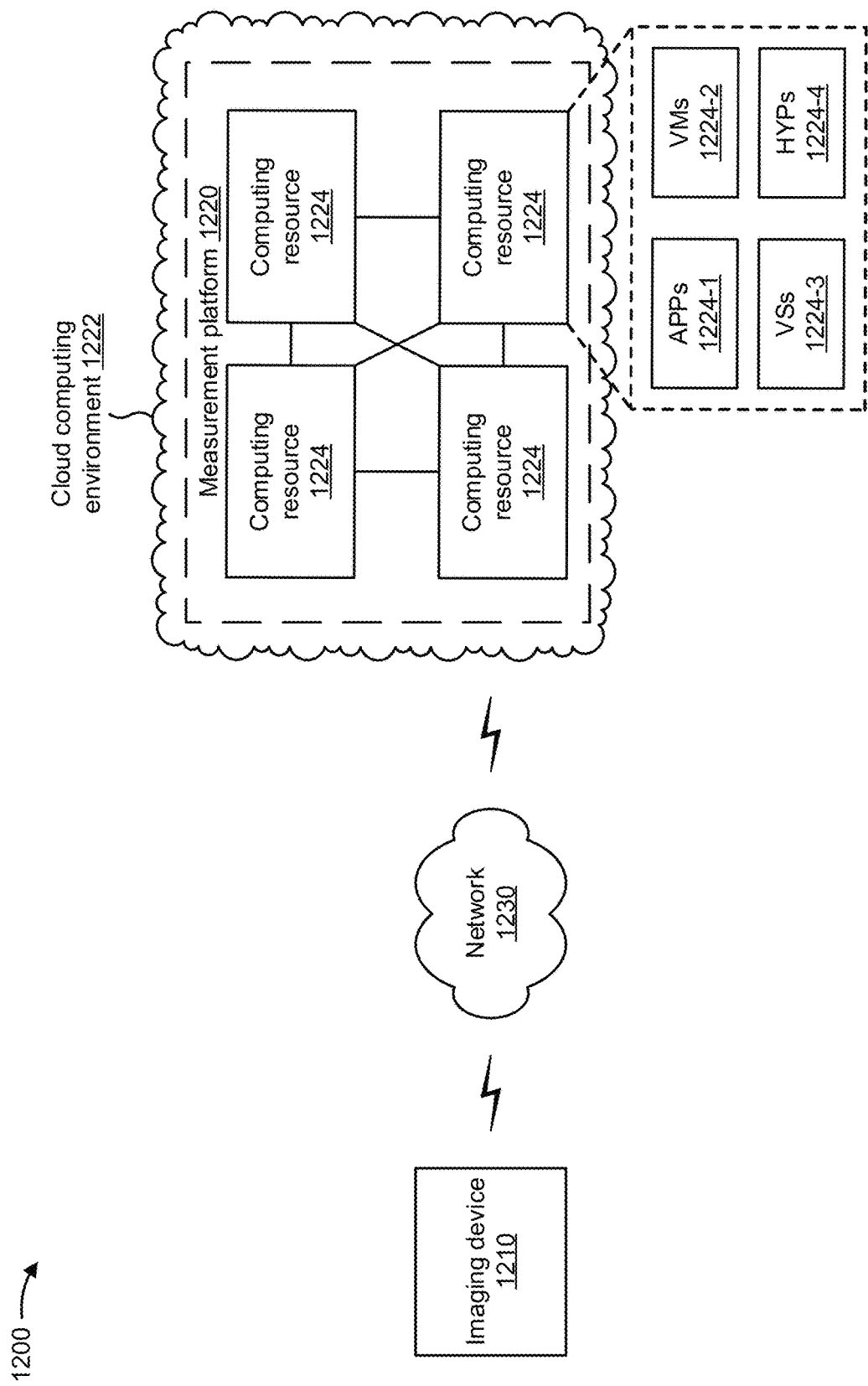
FIG. 12 is a diagram of an example environment in which systems and/or methods, described herein, may be implemented.

FIG. 12 is a diagram of an example environment 1200 in which systems and/or methods, described herein, may be implemented. As shown in FIG. 12, environment 1200 may include an imaging device 1210, a measurement platform 1220, and a network 1230. Devices of environment 1200 may interconnect via wired connections, wireless connections, or a combination of wired and wireless connections.

Imaging device 1210 includes one or more devices capable of receiving, generating, storing, processing, and/or providing information, such as information described herein. For example, imaging device 1210 may include a digital camera, a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device. In some implementations, imaging device 1210 may receive information from and/or transmit information to measurement platform 1220.

In some implementations, imaging device 1210 may be attached to a movable frame, which may permit imaging device 1210 to be moved horizontally and/or vertically around machine 110 to different positions. The movable frame may permit imaging device 1210 to be rotated so that imaging device 1210 may be located at different distances and orientations relative to machine 110. In some implementations, imaging device 1210 may be operated by an operator capable of moving to different positions relative to machine 110. The operator may acquire multiple two-dimensional images of machine 110 and/or undercarriage 112 from different distances and from different orientations.

Measurement platform 1220 includes one or more devices that automatically determine wear of machine components (e.g., of machine 110) based on images received from imaging device 1210. In some implementations, measurement platform 1220 may be designed to be modular such that certain software components may be swapped in or out depending on a particular need. As such, measurement platform 1220 may be easily and/or quickly reconfigured for different uses. In some implementations, measurement platform 1220 may receive information from and/or transmit information to one or more imaging devices 1210.

In some implementations, as shown, measurement platform 1220 may be hosted in a cloud computing environment 1222. Notably, while implementations described herein describe measurement platform 1220 as being hosted in cloud computing environment 1222, in some implementations, measurement platform 1220 may not be cloud-based (i.e., may be implemented outside of a cloud computing environment) or may be partially cloud-based.

Cloud computing environment 1222 includes an environment that hosts measurement platform 1220. Cloud computing environment 1222 may provide computation, software, data access, storage, etc. services that do not require end-user knowledge of a physical location and configuration of system(s) and/or device(s) that hosts measurement platform 1220. As shown, cloud computing environment 1222 may include a group of computing resources 1224 (referred to collectively as "computing resources 1224" and individually as "computing resource 1224").

Computing resource 1224 includes one or more personal computers, workstation computers, server devices, or other types of computation and/or communication devices. In some implementations, computing resource 1224 may host measurement platform 1220. The cloud resources may include compute instances executing in computing resource 1224, storage devices provided in computing resource 1224, data transfer devices provided by computing resource 1224, etc. In some implementations, computing resource 1224 may communicate with other computing resources 1224 via wired connections, wireless connections, or a combination of wired and wireless connections.

As further shown in FIG. 12, computing resource 1224 includes a group of cloud resources, such as one or more applications ("APPs") 1224-1, one or more virtual machines ("VMs") 1224-2, virtualized storage ("VSs") 1224-3, one or more hypervisors ("HYPs") 1224-4, and/or the like.

Application 1224-1 includes one or more software applications that may be provided to or accessed by imaging device 1210. Application 1224-1 may eliminate a need to install and execute the software applications on imaging device 1210. For example, application 1224-1 may include software associated with measurement platform 1220 and/or any other software capable of being provided via cloud computing environment 1222. In some implementations, one application 1224-1 may send/receive information to/from one or more other applications 1224-1, via virtual machine 1224-2.

Virtual machine 1224-2 includes a software implementation of a machine (e.g., a computer) that executes programs like a physical machine. Virtual machine 1224-2 may be either a system virtual machine or a process virtual machine, depending upon use and degree of correspondence to any real machine by virtual machine 1224-2. A system virtual machine may provide a complete system platform that supports execution of a complete operating system ("OS"). A process virtual machine may execute a single program, and may support a single process. In some implementations, virtual machine 1224-2 may execute on behalf of a user (e.g., a user of imaging device 1210 or an operator of measurement platform 1220), and may manage infrastructure of cloud computing environment 1222, such as data management, synchronization, or long-duration data transfers.

Virtualized storage 1224-3 includes one or more storage systems and/or one or more devices that use virtualization techniques within the storage systems or devices of computing resource 1224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1224-4 may provide hardware virtualization techniques that allow multiple operating systems (e.g., "guest operating systems") to execute concurrently on a host computer, such as computing resource 1224. Hypervisor 1224-4 may present a virtual operating platform to the guest operating systems, and may manage the execution of the guest operating systems. Multiple instances of a variety of operating systems may share virtualized hardware resources.

Network 1230 includes one or more wired and/or wireless networks. For example, network 1230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 12 are provided as an example. In practice, there may be additional devices and/or networks, fewer devices and/or networks, different devices and/or networks, or differently arranged devices and/or networks than those shown in FIG. 12. Furthermore, two or more devices shown in FIG. 12 may be implemented within a single device, or a single device shown in FIG. 12 may be implemented as multiple, distributed devices. Additionally, or alternatively, a set of devices (e.g., one or more devices) of environment 1200 may perform one or more functions described as being performed by another set of devices of environment 1200.

Figure 13:
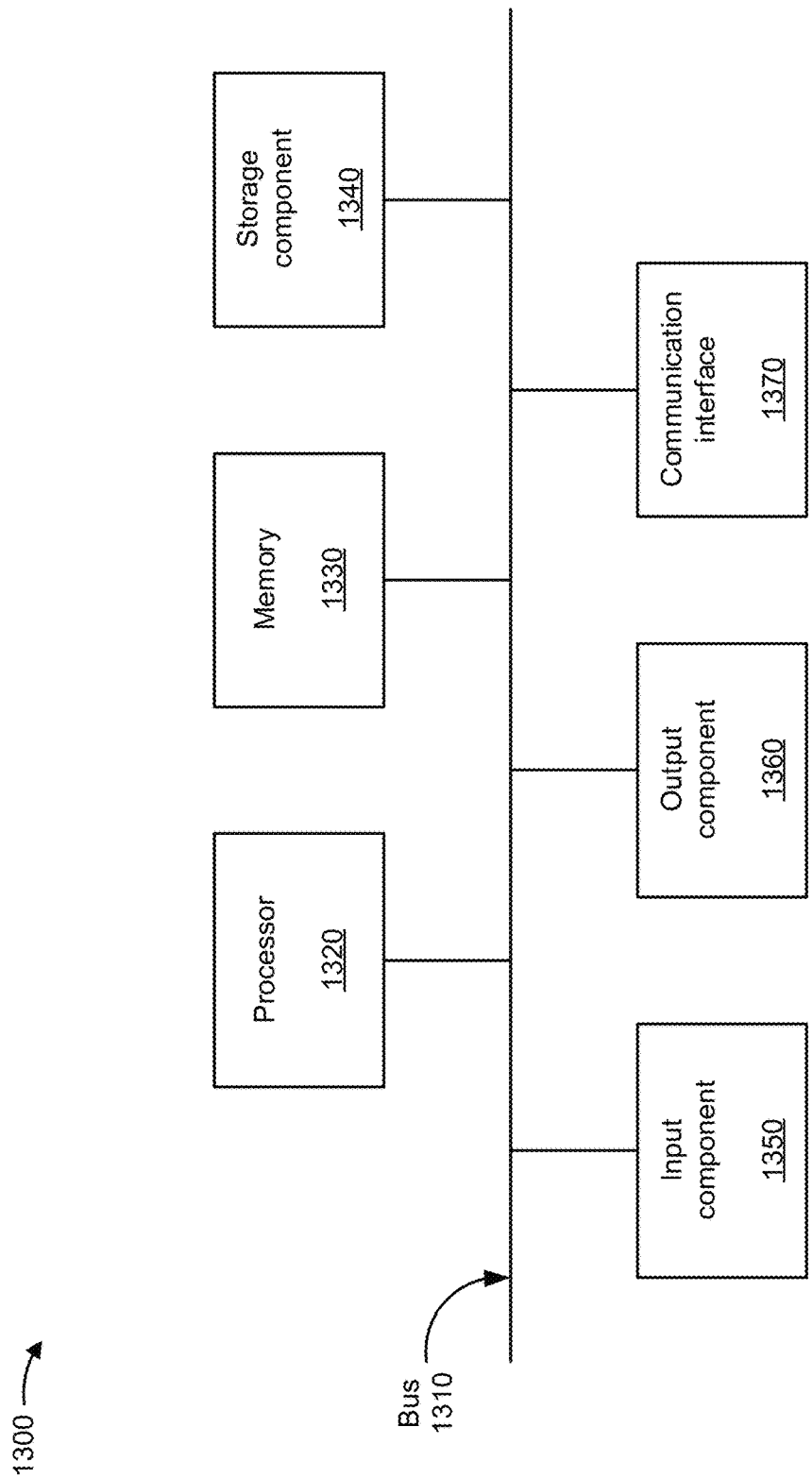
FIG. 13 is a diagram of example components of one or more devices of FIG. 12.

FIG. 13 is a diagram of example components of a device 1300. Device 1300 may correspond to imaging device 1210, measurement platform 1220, and/or computing resource 1224. In some implementations, imaging device 1210, measurement platform 1220, and/or computing resource 1224 may include one or more devices 1300 and/or one or more components of device 1300. As shown in FIG. 13, device 1300 may include a bus 1310, a processor 1320, a memory 1330, a storage component 1340, an input component 1350, an output component 1360, and a communication interface 1370.

Bus 1310 includes a component that permits communication among the components of device 1300. Processor 1320 is implemented in hardware, firmware, or a combination of hardware and software. Processor 1320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1320 includes one or more processors capable of being programmed to perform a function. Memory 1330 includes a random access memory (RAM), a read only memory (ROM), and/or another type of dynamic or static storage device (e.g., a flash memory, a magnetic memory, and/or an optical memory) that stores information and/or instructions for use by processor 1320.

Storage component 1340 stores information and/or software related to the operation and use of device 1300. For example, storage component 1340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 1350 includes a component that permits device 1300 to receive information, such as via user input (e.g., a touch screen display, a keyboard, a keypad, a mouse, a button, a switch, and/or a microphone). Additionally, or alternatively, input component 1350 may include a sensor for sensing information (e.g., a global positioning system (GPS) component, an accelerometer, a gyroscope, and/or an actuator). Output component 1360 includes a component that provides output information from device 1300 (e.g., a display, a speaker, and/or one or more light-emitting diodes (LEDs)).

Communication interface 1370 includes a transceiver-like component (e.g., a transceiver and/or a separate receiver and transmitter) that enables device 1300 to communicate with other devices, such as via a wired connection, a wireless connection, or a combination of wired and wireless connections. Communication interface 1370 may permit device 1300 to receive information from another device and/or provide information to another device. For example, communication interface 1370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 1300 may perform one or more processes described herein. Device 1300 may perform these processes based on processor 1320 executing software instructions stored by a non-transitory computer-readable medium, such as memory 1330 and/or storage component 1340. A computer-readable medium is defined herein as a non-transitory memory device. A memory device includes memory space within a single physical storage device or memory space spread across multiple physical storage devices.

Software instructions may be read into memory 1330 and/or storage component 1340 from another computer-readable medium or from another device via communication interface 1370. When executed, software instructions stored in memory 1330 and/or storage component 1340 may cause processor 1320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 13 are provided as an example. In practice, device 1300 may include additional components, fewer components, different components, or differently arranged components than those shown in FIG. 3. Additionally, or alternatively, a set of components (e.g., one or more components) of device 1300 may perform one or more functions described as being performed by another set of components of device 1300.

Figure 14:
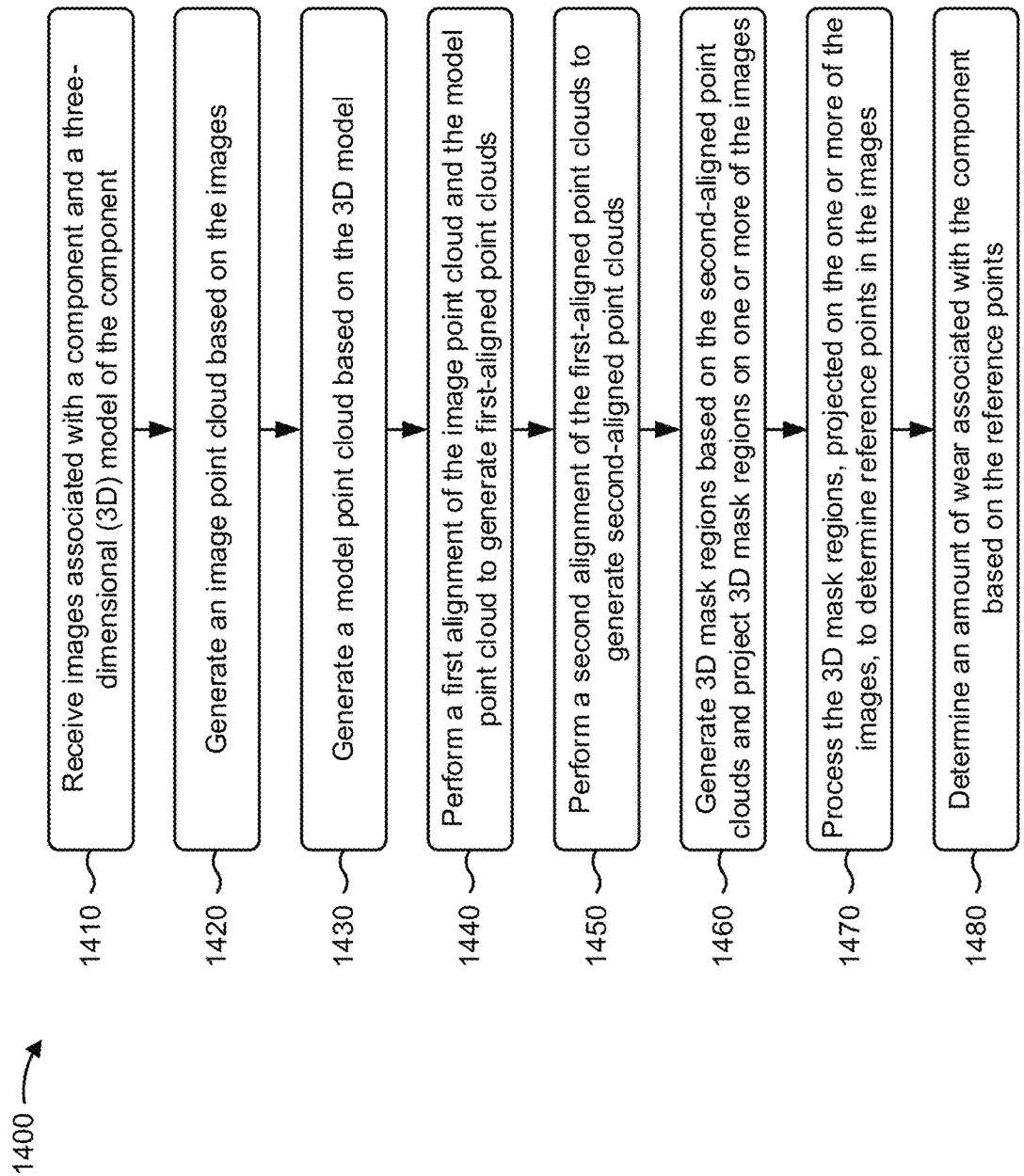
FIG. 14 is a flow chart of an example process for automatically determining wear of machine components based on images.

FIG. 14 is a flow chart of an example process 1400 for automatically determining wear of machine components based on images. In some implementations, one or more process blocks of FIG. 14 may be performed by a measurement platform (e.g., measurement platform 1220). In some implementations, one or more process blocks of FIG. 14 may be performed by another device or a group of devices separate from or including measurement platform 1220, such as imaging device 1210.

As shown in FIG. 14, process 1400 may include receiving images associated with a component and a three-dimensional (3D) model of the component (block 1410). For example, the measurement platform (e.g., using computing resource 1224, processor 1320, communication interface 1370, and/or the like) may receive images associated with a component and a three-dimensional (3D) model of the component, as described above in connection with FIGS. 1-11.

As further shown in FIG. 14, process 1400 may include generating an image point cloud based on the images (block 1420). For example, the measurement platform (e.g., using computing resource 1224, processor 1320, storage component 1340, and/or the like) may generate an image point cloud based on the images, as described above in connection with FIGS. 1-11.

As further shown in FIG. 14, process 1400 may include generating a model point cloud based on the 3D model (block 1430). For example, the measurement platform (e.g., using computing resource 1224, processor 1320, memory 1330, and/or the like) may generate a model point cloud based on the 3D model, as described above in connection with FIGS. 1-11.

As further shown in FIG. 14, process 1400 may include performing a first alignment of the image point cloud and the model point cloud to generate first-aligned point clouds (block 1440). For example, the measurement platform (e.g., using computing resource 1224, processor 1320, memory 1330, and/or the like) may perform a first alignment of the image point cloud and the model point cloud to generate first-aligned point clouds, as described above in connection with FIGS. 1-11.

As further shown in FIG. 14, process 1400 may include performing a second alignment of the first-aligned point clouds to generate second-aligned point clouds (block 1450). For example, the measurement platform (e.g., using computing resource 1224, processor 1320, storage component 1340, and/or the like) may perform a second alignment of the first-aligned point clouds to generate second-aligned point clouds, as described above in connection with FIGS. 1-11.

As further shown in FIG. 14, process 1400 may include generating 3D mask regions based on the second-aligned point clouds, and projecting the 3D mask regions on one or more of the images (block 1460). For example, the measurement platform (e.g., using computing resource 1224, processor 1320, memory 1330, communication interface 1370, and/or the like) may generate 3D mask regions based on the second-aligned point clouds, and may project the 3D mask regions on one or more of the images, as described above in connection with FIGS. 1-11.

As further shown in FIG. 14, process 1400 may include processing the 3D mask regions, projected on the one or more of the images, to determine reference points in the images (block 1470). For example, the measurement platform (e.g., using computing resource 1224, processor 1320, storage component 1340, and/or the like) may process the 3D mask regions, projected on the one or more of the images, to determine reference points in the images, as described above in connection with FIGS. 1-11.

As further shown in FIG. 14, process 1400 may include determining an amount of wear associated with the component based on the reference points (block 1480). For example, the measurement platform (e.g., using computing resource 1224, processor 1320, memory 1330, and/or the like) may determine an amount of wear associated with the component based on the reference points, as described above in connection with FIGS. 1-11.

Process 1400 may include additional implementations, such as any single implementation or any combination of implementations described below and/or described with regard to any other process described herein.

In some implementations, the measurement platform may perform an action based on the amount of wear associated with the component. In some implementations, the measurement platform may process the image point cloud, with a filter, to generate a filtered image point cloud, and may perform the first alignment of the filtered image point cloud and the model point cloud to generate the first-aligned point clouds. In some implementations, the measurement platform may sample points from the three-dimensional model of the component, and may generate the model point cloud based on sampling the points from three-dimensional model of the component.

In some implementations, the measurement platform may process the first-aligned point clouds, with an iterative closest point method, to generate the second-aligned point clouds. In some implementations, the measurement platform may process the three-dimensional mask regions projected on the one or more of the plurality of images, with an edge detection method and a Hough transform method, to determine the reference points in the plurality of images. In some implementations, the measurement platform may project the reference points in the image point cloud, may determine locations of at least two of the reference points projected in the image point cloud, may determine an image distance between the locations, and may determine the amount of wear associated with the component based on the image distance.

In some implementations, the measurement platform may perform an action that includes one or more of providing, for display, information indicating the amount of wear associated with the component, automatically ordering a replacement component for the component, providing, for display, an offer associated with the replacement component, and/or providing, for display, an image of the component with an overlay of a model component provided by the three-dimensional model. In some implementations, the measurement platform may process the image point cloud, with a Gaussian filter, to generate a filtered image point cloud, and may perform the first alignment of the filtered image point cloud and the model point cloud to generate the first-aligned point clouds. In some implementations, the measurement platform may sample points from the three-dimensional model of the component with synthetic cameras, and may generate the model point cloud based on sampling the points from three-dimensional model of the component with the synthetic cameras.

In some implementations, the measurement platform may process the first-aligned point clouds, with an iterative closest point method and based on a non-wear component associated with the component, to generate the second-aligned point clouds. In some implementations, the measurement platform may process the plurality of mask regions projected on the plurality of images, with an edge detection method, to identify edges in the plurality of mask regions, and may process the edges, with a Hough transform method, to determine the reference points in the plurality of images. In some implementations, the measurement platform may determine an image distance between the locations, and may determine the amount of wear associated with the component based on the image distance. In some implementations, the component may include a track of an undercarriage of the machine.

Although FIG. 14 shows example blocks of process 1400, in some implementations, process 1400 may include additional blocks, fewer blocks, different blocks, or differently arranged blocks than those depicted in FIG. 14. Additionally, or alternatively, two or more of the blocks of process 1400 may be performed in parallel.

INDUSTRIAL APPLICABILITY

Wear measurement platform 1220 may be used to perform measurement of components on a wide variety of machines.

In some implementations, wear measurement platform 1220 may be used to obtain two-dimensional images of an entire machine or of a particular component of the machine, and to obtain dimensional measurements using the two-dimensional images without removing the machine from service. The measured dimensions may be compared to specified dimensions to determine amounts of wear on one or more components included in the two-dimensional images.

In this way, several different stages of the process for determining wear of machine components based on images are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, current systems require manual selection of scale features on an object of a known size in several images, and require manual selection of reference points in several images. Finally, automating the process for determining wear of machine components based on images conserves computing resources (e.g., processing resources, memory resources, and/or the like) that would otherwise be wasted in attempting to determine wear of machine components based on images.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

ELEMENT LIST

100 Example implementation
110 Machine
112 Undercarriage
114 Frame 114
116 Track 116
118 Sprocket cover
120 Idler wheel
122 Upper rollers
124 Lower rollers 124
126 Links
128 Pins
130 Images of undercarriage
200 Example implementation
210 Generate image point cloud
220 Generate filtered image point cloud
300 Example implementation
310 Receive 3D model of undercarriage
320 Sample points from 3D model
330 Generate model point cloud
400 Example implementation
410 Gross align and scale model point cloud and filtered image point cloud
500 Example implementation
510 Fine-tune align and scale gross aligned and scaled point clouds
600 Example implementation
610 Generate 3D mask regions on fine-tune aligned and scaled point clouds
700 Example implementation
710 Project 3D mask regions on original images
800 Example implementation
810 Process each 3D mask region to identify pin center
900 Example implementation
910 Project pin centers into image point cloud
1000 Example implementation
1010 Determine wear based on actual and expected pin center distances
1100 Example implementation
1110 Perform an action based on determined wear
1200 Environment
1210 Imaging device
1220 Measurement platform
1222 Cloud computing environment
1224 Computing resource
1224-1 Applications
1224-2 Virtual machines
1224-3 Virtual storage
1224-4 Hypervisors
1230 Network
1300 Device
1310 Bus
1320 Processor
1330 Memory
1340 Storage component
1350 Input component
1360 Output component
1370 Communication interface

What is claimed is:

1. A device comprising:
one or more memory devices; and
one or more processors, operatively coupled to the one or more memory devices, configured to:
identify one or more two-dimensional images of an undercarriage of a machine;
generate one or more point clouds based on the one or more two-dimensional images of the undercarriage of the machine;
identify, based on the one or more point clouds, one or more three-dimensional mask regions associated with pins that connect links of a track of the undercarriage;
project the one or more three-dimensional mask regions on the one or more two-dimensional images of the undercarriage;
process the one or more three-dimensional mask regions projected on the one or more two-dimensional images of the undercarriage; and
determine a wear of a component of the machine based on processing the one or more three-dimensional mask regions projected on the one or more two-dimensional images of the undercarriage, wherein, when determining the wear of the component, the one or more processors are configured to:
 determine distances between locations of pin centers of the pins,
 determine actual pin center distances based on the distances between the locations of the pin centers of the pins, and
 determine the wear of the component based on the actual pin center distances and expected pin center distances.

2. The device of claim 1, wherein the component is one of the pins, one of the links, the track, or another portion of the undercarriage.

3. The device of claim 1, wherein the one or more point clouds include a model point cloud that is generated based on a three-dimensional model of the component.

4. The device of claim 1, wherein the one or more point clouds include a filtered image point cloud.

5. The device of claim 1, wherein, when identifying the one or more three-dimensional mask regions, the one or more processors are configured to:
 generate the one or more three-dimensional mask regions based on an estimate of a location of one of the pins.

6. The device of claim 1, wherein the one or more processors are further configured to:
 provide an alert indicating an amount of the wear.

7. The device of claim 6, wherein the one or more processors are further configured to:
 cause, based on determining the wear of the component, the machine to autonomously drive to a repair facility, or
 instruct, based on determining the wear of the component, a robot to load a replacement of the component for delivery to a location of the machine.

8. A method comprising:
 identifying, by one or more devices, one or more images of an undercarriage of a machine;
 generating a model point cloud based on the one or more images of the undercarriage of the machine;
 identifying, by the one or more devices, one or more three-dimensional mask regions associated with pins that connect links of a track of the undercarriage based on the model point cloud;
 processing the model point cloud;
 projecting, by the one or more devices, the one or more three-dimensional mask regions on the one or more images of the undercarriage;
 processing, by the one or more devices, the one or more three-dimensional mask regions projected on the one or more images of the undercarriage; and
 determining, by the one or more devices, a wear of a component of the machine based on processing the one or more three-dimensional mask regions projected on the one or more images of the undercarriage.

9. The method of claim 8, wherein identifying the one or more three-dimensional mask regions further comprises:
 generating the one or more three-dimensional mask regions based on an estimate of a location of one of the pins.

10. The method of claim 8, wherein determining the wear of the component comprises:
 determining distances between locations of pin centers of the pins,
 determining actual pin center distances based on the distances between the locations of the pin centers of the pins, and
 determining the wear of the component based on the actual pin center distances and expected pin center distances.

11. The method of claim 8, further comprising:
 instructing, based on determining the wear of the component, another machine to deliver a replacement of the component to a location of the machine.

12. The method of claim 8, further comprising:
 providing an alert indicating an amount of the wear.

13. The method of claim 8, wherein generating the image point cloud or the model point cloud based on the one or more images of the undercarriage of the machine comprises generating the image point cloud, and wherein the method further comprises:
 filtering the image point cloud to generate a filtered image point cloud.

14. A non-transitory computer-readable medium storing instructions, the instructions comprising:
 one or more instructions that, when executed by one or more processors of a device, cause the one or more processors to:
  identify one or more two-dimensional images of an undercarriage of a machine, wherein the undercarriage includes one or more pins;
  identify one or more three-dimensional mask regions;
  project the one or more three-dimensional mask regions on the one or more two-dimensional images of the undercarriage;
  process the one or more three-dimensional mask regions projected on the one or more two-dimensional images of the undercarriage; and
  determine a wear of a component of the machine based on processing the one or more three-dimensional mask regions projected on the one or more two-dimensional images of the undercarriage,
  wherein the wear of the component is further determined based on one or more of actual pin center distances or expected pin center distances.

15. The non-transitory computer-readable medium of claim 14, wherein the component is one of the one or more pins of the undercarriage, a link of the undercarriage, or a track of the undercarriage.

16. The non-transitory computer-readable medium of claim 14, wherein one or more three-dimensional mask regions are based on one or more of a model point cloud or an estimate of a location of one of the one or more pins of the undercarriage.

17. The non-transitory computer-readable medium of claim 14, further comprising:
 one or more instructions that, when executed by the one or more processors, cause the one or more processors to:
  instruct, based on determining the wear of the component, another machine to load or deliver a replacement of the component.

18. The non-transitory computer-readable medium of claim 14, wherein one or more three-dimensional mask regions are based on a filtered image point cloud.

* * * * *